(12) United States Patent
Lambertson, Jr. et al.

(10) Patent No.: US 9,347,472 B2
(45) Date of Patent: May 24, 2016

(54) EXTENSION POLE MECHANISM FOR PAINT ROLLER

(71) Applicant: The Sherwin-Williams Company, Cleveland, OH (US)

(72) Inventors: Michael C. Lambertson, Jr., Aurora, OH (US); Rita Forman-House, Avon Lake, OH (US); Dennis P. De Renzo, Jr., Concord Township, OH (US); Michael O'Banion, West Minister, MD (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 14/268,718

(22) Filed: May 2, 2014

(65) Prior Publication Data

US 2014/0270911 A1 Sep. 18, 2014

Related U.S. Application Data

(63) Continuation-in-part of application No. 13/834,879, filed on Mar. 15, 2013.

(51) Int. Cl.
*B05C 17/02* (2006.01)
*B25G 1/04* (2006.01)
(Continued)

(52) U.S. Cl.
CPC ............ *F16B 7/1454* (2013.01); *B05C 17/0205* (2013.01); *B25G 1/04* (2013.01); *B25G 1/102* (2013.01); *F16B 7/042* (2013.01); *Y10T 403/32475* (2015.01);
(Continued)

(58) Field of Classification Search
CPC ........ B25G 1/04; B25G 1/102; E04H 12/182; F16B 7/0406; F16B 7/0413; F16B 7/042; F16B 7/105; F16B 7/14; F16B 7/1418; F16B 7/1454; B05C 17/0205
USPC .......... 403/109.1–109.3, 109.5, 109.7, 109.8, 403/322.3, 322.4, 325, 327, 377; 81/177.2; 16/427, 429
See application file for complete search history.

(56) References Cited

U.S. PATENT DOCUMENTS 2,806,723 A * 9/1957 Fairclough .................... 403/104
3,596,946 A    8/1971 Burton et al.
(Continued)

FOREIGN PATENT DOCUMENTS

EP    2387934 A1    11/2011
GB    2413518 A     11/2005

OTHER PUBLICATIONS

Office Action issued Dec. 24, 2014 for U.S. Appl. No. 13/834,879.
(Continued)

*Primary Examiner* — Josh Skroupa
(74) *Attorney, Agent, or Firm* — Daniel A. Sherwin, Esq.; Roger D. Emerson, Esq.; Emerson Thomson Bennett LLC

(57) ABSTRACT

An extendable pole mechanism may be used with a pair of poles that are longitudinally movable to adjust the overall length of both poles. The mechanism may include a housing that receives the poles and a trigger that is moveable with respect to the housing to adjust the mechanism between a use condition, where the poles are held in a longitudinally relative fixed position, and an adjustment condition, where the poles are longitudinally moveable with respect to each other.

17 Claims, 26 Drawing Sheets

(51) Int. Cl.
 *F16B 7/04* (2006.01)
 *F16B 7/14* (2006.01)
 *B25G 1/10* (2006.01)

(52) U.S. Cl.
 CPC ..... *Y10T 403/32501* (2015.01); *Y10T 403/595* (2015.01); *Y10T 403/599* (2015.01); *Y10T 403/602* (2015.01)

(56) References Cited

U.S. PATENT DOCUMENTS

| | | | |
|---|---|---|---|
| 5,288,161 A | 2/1994 | Graves et al. | |
| 5,595,410 A * | 1/1997 | Wilson et al. | 292/306 |
| 6,869,112 B2 * | 3/2005 | Guidetti | 403/109.1 |
| 7,222,892 B2 * | 5/2007 | Guidetti | 403/109.1 |
| 7,293,934 B1 | 11/2007 | Huang | |
| 8,128,306 B2 | 3/2012 | Gorza | |
| 8,875,350 B2 | 11/2014 | Bukovitz | |
| 2010/0258701 A1 | 10/2010 | Foreman | |
| 2012/0107037 A1 | 5/2012 | Huang | |
| 2013/0185945 A1 | 7/2013 | Wang | |

OTHER PUBLICATIONS

International Search Report for International Patent Application No. PCT/US2014/025405 mailed Jul. 23, 2014.
International Preliminary Report on Patentability for International Patent Application No. PCT/US2014/025405 completed Jan. 22, 2015.
Office Action issued Jul. 20, 2015 for U.S. Appl. No. 13/834,879.

* cited by examiner

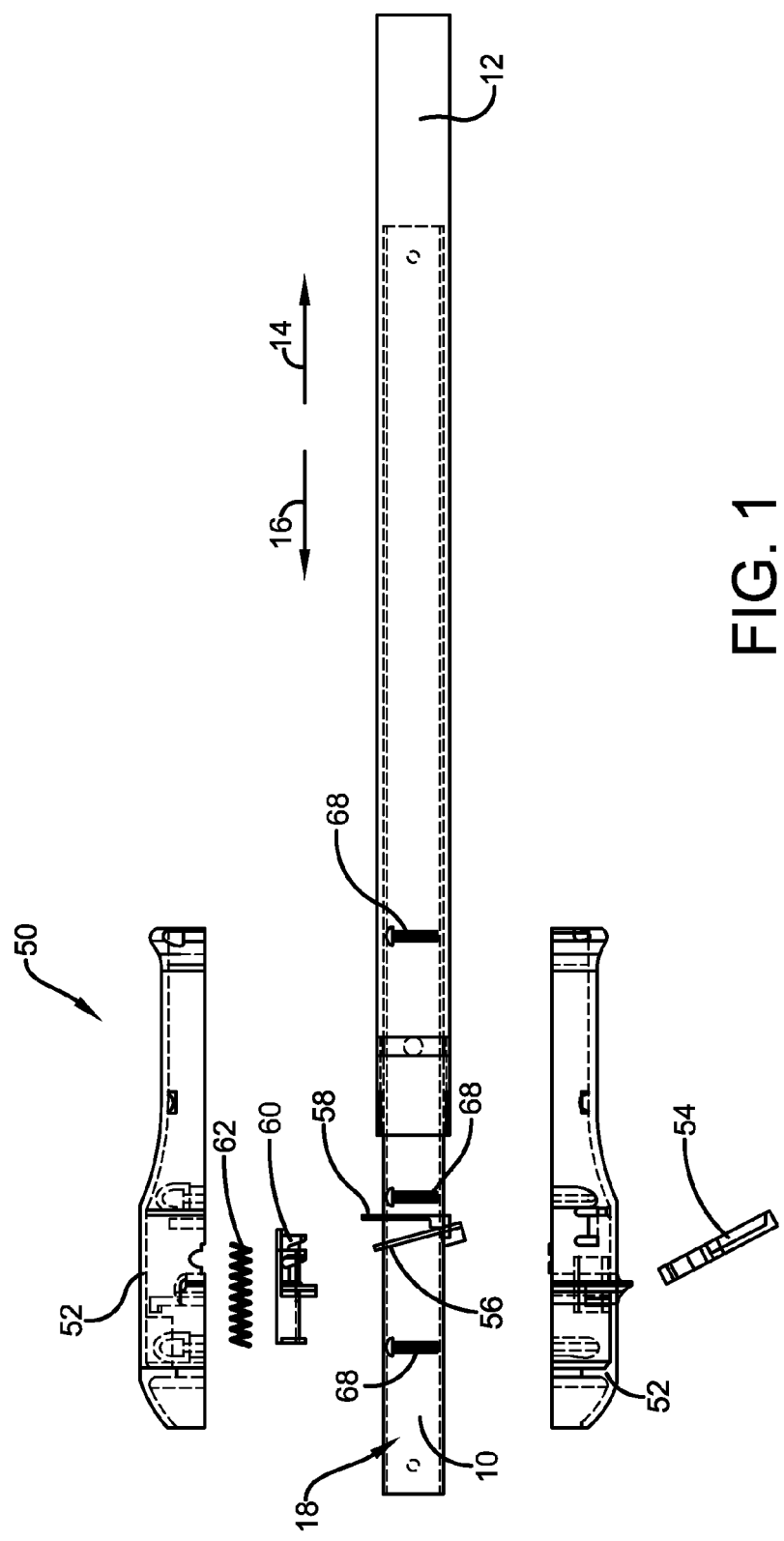

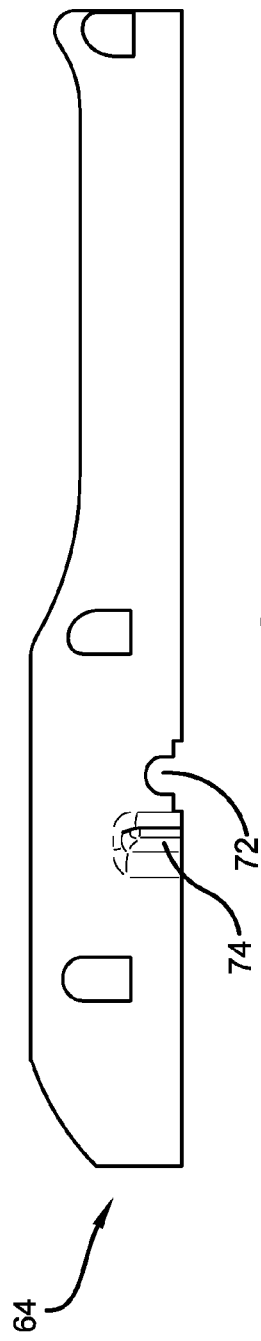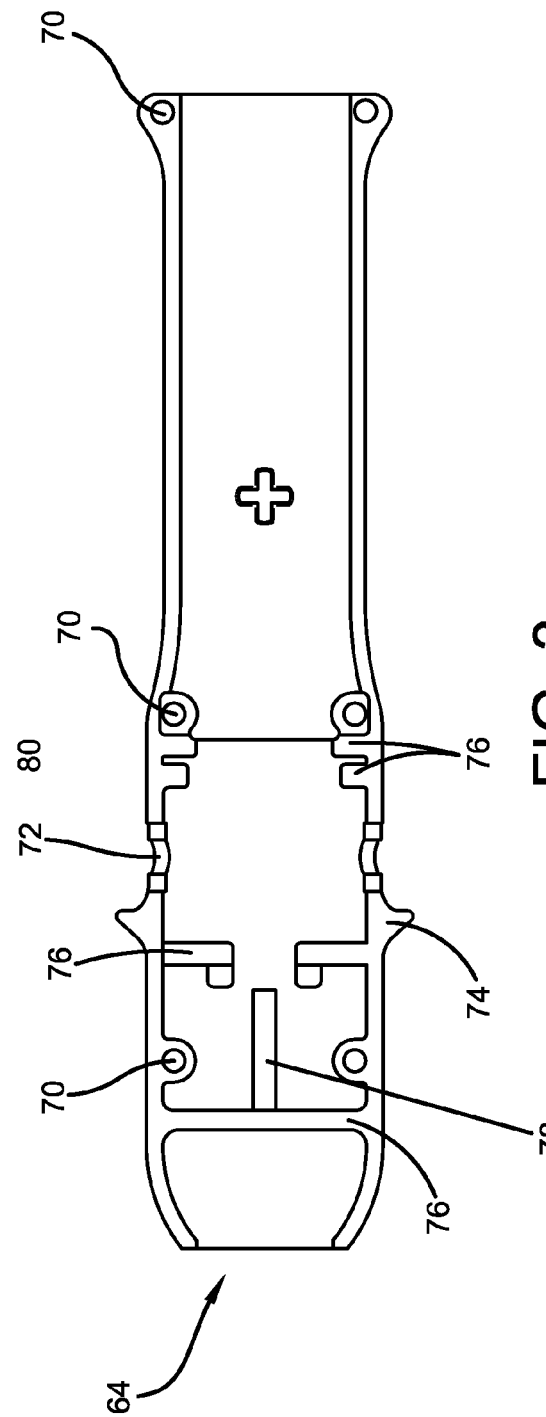

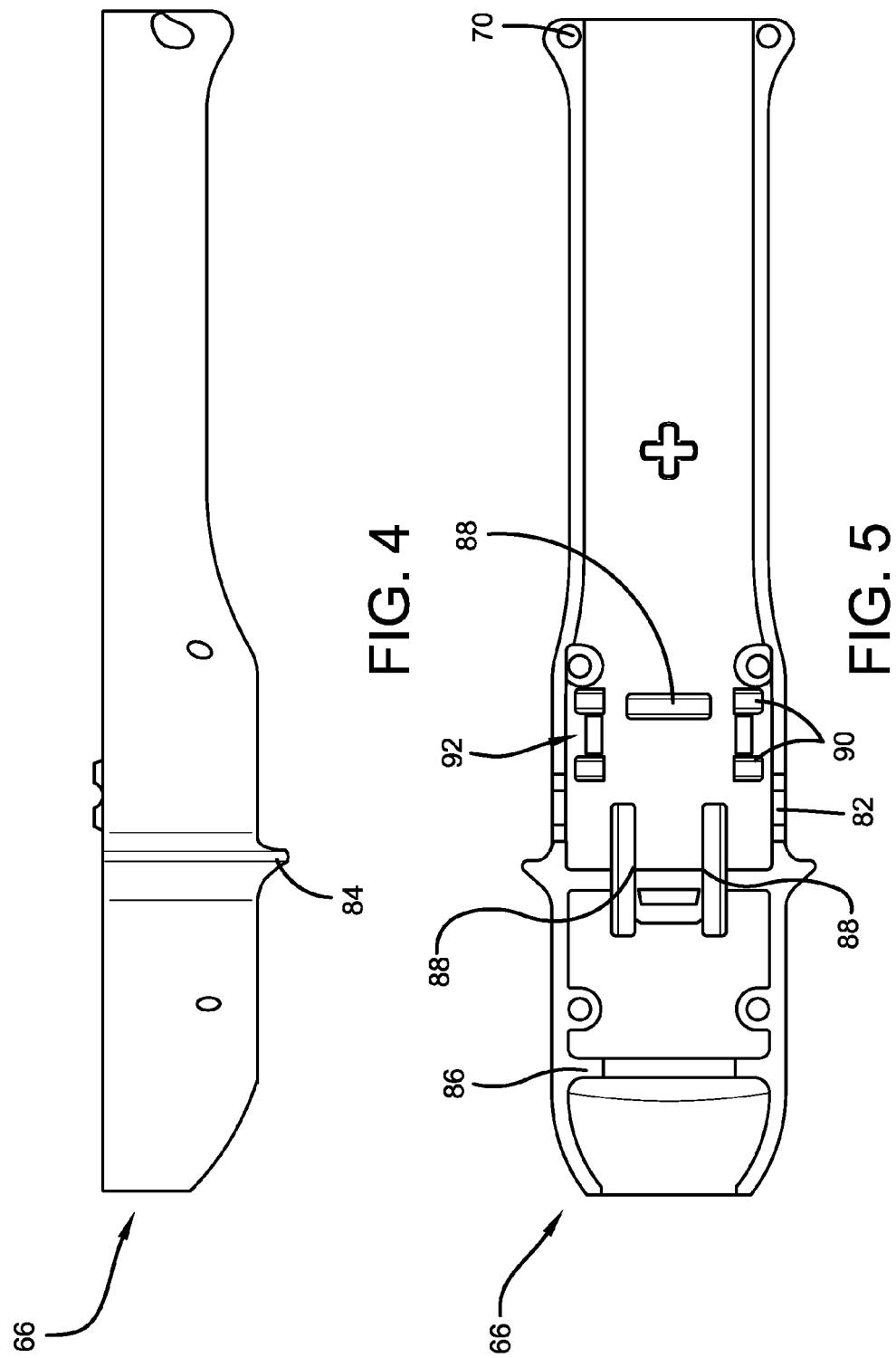

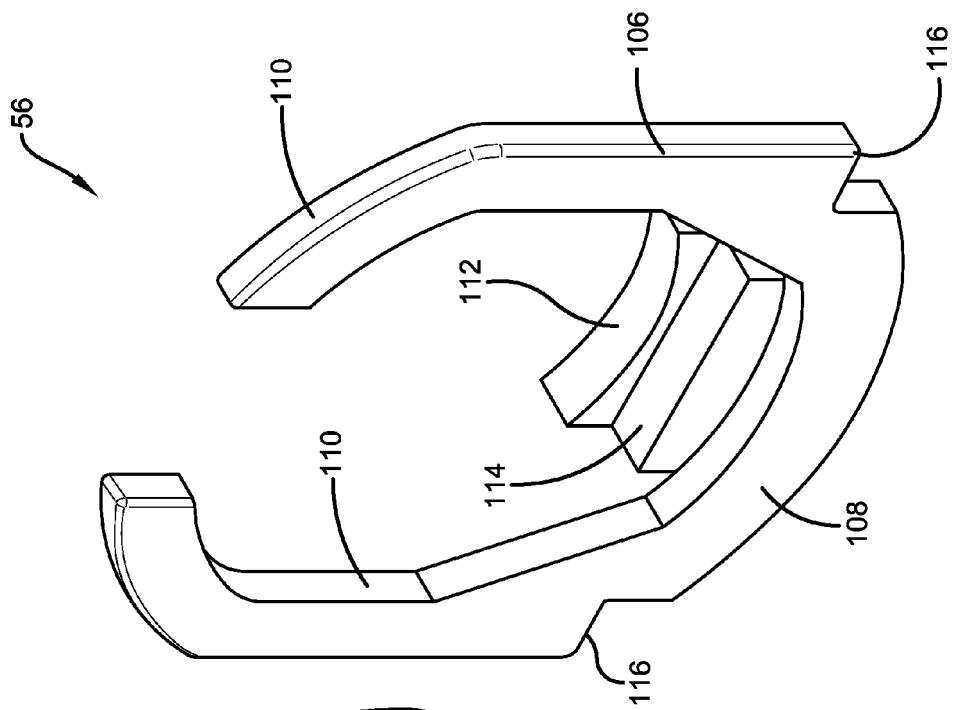
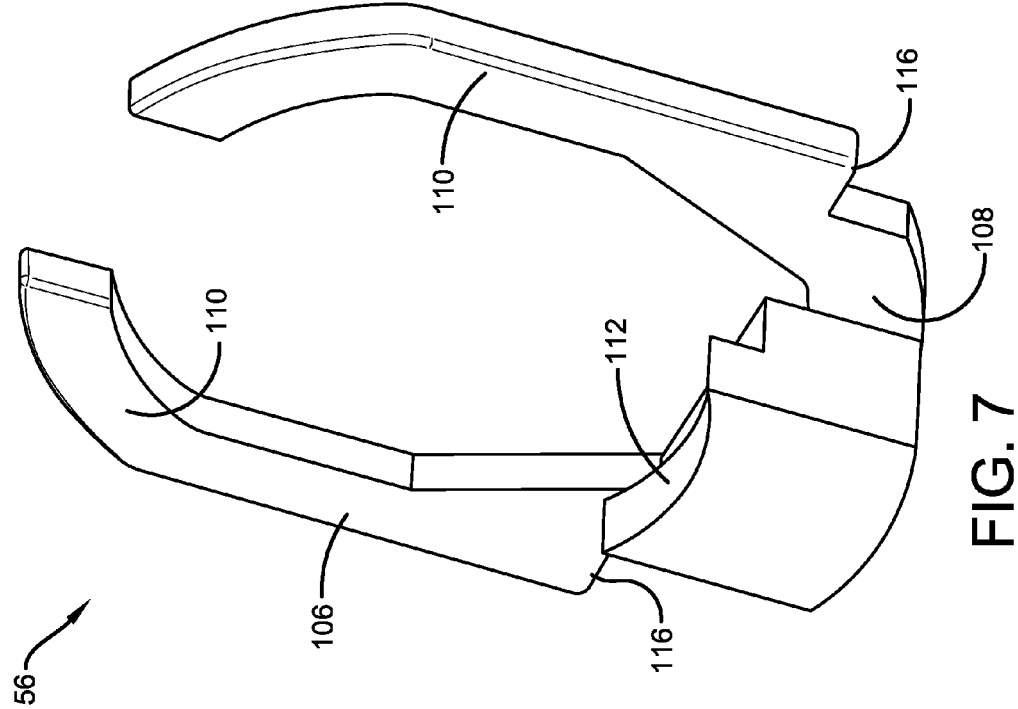

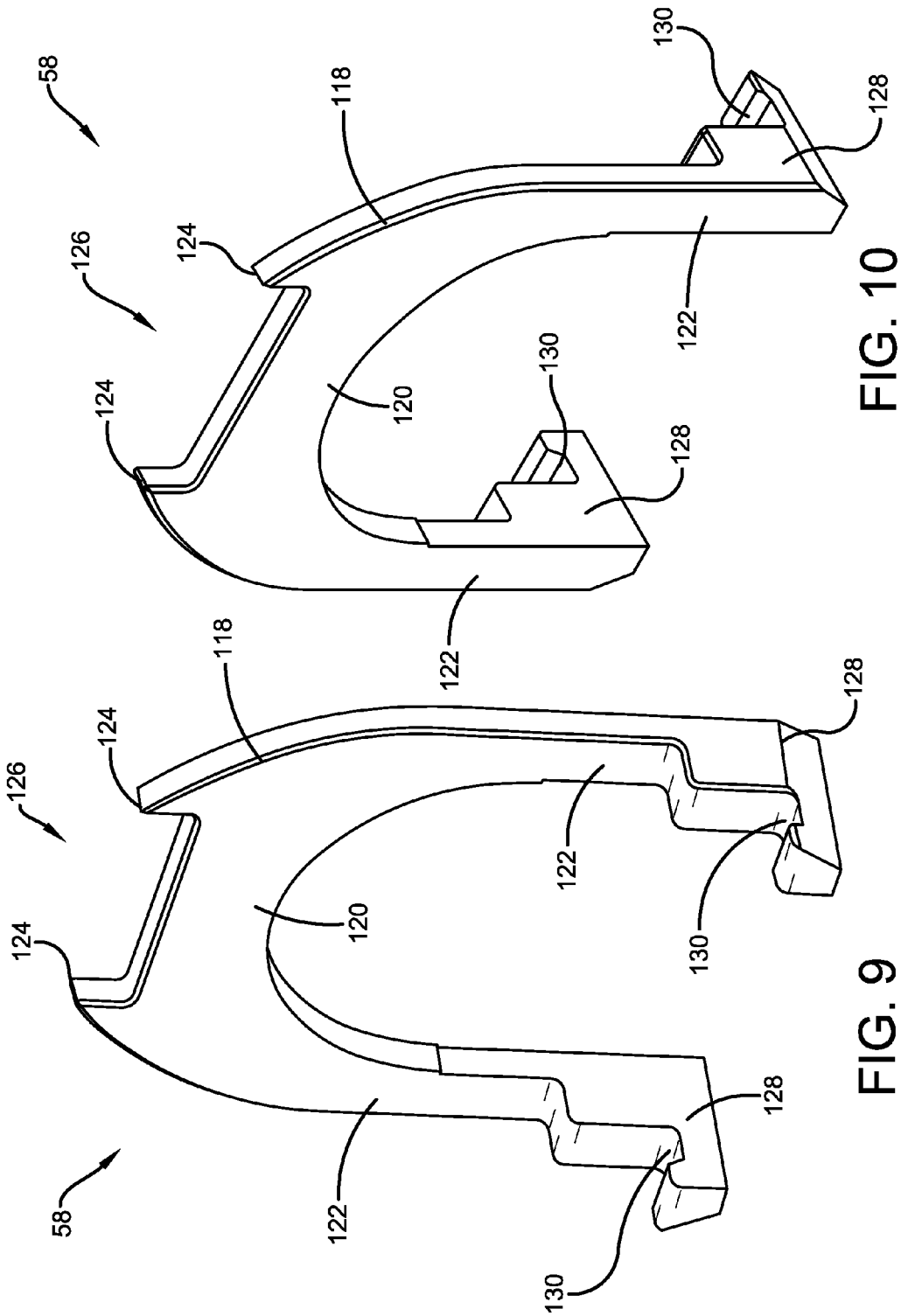

EXTENSION POLE MECHANISM FOR PAINT ROLLER

This application is a continuation-in-part of U.S. patent application Ser. No. 13/834,879 filed Mar. 15, 2013, entitled "EXTENSION POLE MECHANISM FOR PAINT ROLLER."

I. BACKGROUND

A. Field of the Invention

This invention is in the field of methods and apparatuses for extending and contracting the length of poles used with paint related accessories and more specifically to methods and apparatuses for an extendable pole mechanism that is easily adjusted between a use condition and an adjustment condition with one hand.

B. Description of Related Art

It is well known in the paint industry to provide adjustable length poles that are designed to connect to and disconnect from paint accessories. A painter, for example, requires the pole holding a paint roller to be at a relatively shorter length when painting a surface at waist height but to be at a relatively longer length when painting a surface far above his/her head. Known adjustable length poles, however, have disadvantages.

One disadvantage to known adjustable length poles is that they are difficult and time consuming to use. Some, for example, require two hands to adjust. Another disadvantage is that they easily come "loose" from their setting, causing the poles to change their length when such change is not desirable. Yet another disadvantage is that many adjustable length poles are only adjustable in discrete length increments. Still another disadvantage is that known adjustable length poles quickly wear out, increasing costs.

What is needed, then, is an extendable pole mechanism that eliminates or reduces the disadvantages just described. Painters would benefit from using an extendable pole mechanism that is durable, remains in its setting, provides infinite length adjustment, and can be easily operated with one hand.

II. SUMMARY

According to one embodiment of this invention, an extendable pole mechanism may be used with a first associated pole that is longitudinally movable with respect to a second associated pole to adjust the overall length of both poles. The extendable pole mechanism may comprise: a housing that receives the first and second associated poles; a first contact device that: (1) is supported to the housing; (2) is moveable with respect to the housing; and, (3) comprises first and second arms that receive the first associated pole; a second contact device that: (1) is supported to the housing; (2) is moveable with respect to the housing; and, (3) comprises first and second arms that receive the first associated pole; a first lever that is: (1) is supported to the housing; and, (2) is moveable with respect to the housing; a second lever that is: (1) is supported to the housing; and, (2) is moveable with respect to the housing; and, a trigger that is: (1) is supported to the housing; and, (2) is moveable with respect to the housing. The extendable pole mechanism may be adjustable by moving the trigger with respect to the housing to cause the first and second levers to move with respect to the housing to cause the first and second contact devices to move with respect to the housing between: (1) a use condition where the first associated pole is held by contact with the first and second contact devices in a longitudinally fixed position with respect to the second associated pole; and, (2) an adjustment condition where: (a) the first associated pole is not held by contact with the first and second contact devices in a longitudinally fixed position with respect to the second associated pole; and, (b) the first associated pole is longitudinally moveable with respect to the second associated pole. A first biasing device may exert a first biasing force that biases the first contact device toward contact with the first associated pole. A second biasing device may exert a second biasing force that biases the second contact device toward contact with the first associated pole.

According to another embodiment of this invention, an extendable pole mechanism may be used with a first associated pole that is longitudinally movable with respect to a second associated pole to adjust the overall length of both poles. The extendable pole mechanism may comprise: a housing that receives the first and second associated poles; a first contact device that: (1) is supported to the housing; and, (2) is moveable with respect to the housing; a second contact device that: (1) is supported to the housing; and, (2) is moveable with respect to the housing; a first lever that is: (1) is supported to the housing; and, (2) is moveable with respect to the housing; a second lever that is: (1) is supported to the housing; and, (2) is moveable with respect to the housing; and, a trigger that is: (1) is supported to the housing; and, (2) is moveable with respect to the housing. The extendable pole mechanism may be adjustable by moving the trigger with respect to the housing to cause the first and second levers to move with respect to the housing to cause the first and second contact devices to move with respect to the housing between: (1) a use condition where the first associated pole is held by contact with the first and second contact devices in a longitudinally fixed position with respect to the second associated pole; and, (2) an adjustment condition where: (a) the first associated pole is not held by contact with the first and second contact devices in a longitudinally fixed position with respect to the second associated pole; and, (b) the first associated pole is longitudinally moveable with respect to the second associated pole.

According to yet another embodiment of this invention, a method may comprise the steps of: (A) providing an extendable pole mechanism for use with a first pole that is longitudinally movable with respect to a second pole, the extendable pole mechanism comprising: (1) a housing that receives the first and second poles; (2) a first contact device that: (a) is supported to the housing; and, (b) is moveable with respect to the housing; (3) a second contact device that: (a) is supported to the housing; and, (b) is moveable with respect to the housing; (4) a first lever that is: (a) is supported to the housing; and, (b) is moveable with respect to the housing; (5) a second lever that is: (a) is supported to the housing; and, (b) is moveable with respect to the housing; and, (6) a trigger that is: (a) is supported to the housing; and, (b) is moveable with respect to the housing; and, (B) adjusting the extendable pole mechanism by moving the trigger with respect to the housing to cause the first and second levers to move with respect to the housing to cause the first and second contact devices to move with respect to the housing from: (1) a use condition where the first pole is held by contact with the first and second contact devices in a longitudinally fixed position with respect to the second pole; and, (2) an adjustment condition where: (a) the first pole is not held by contact with the first and second contact devices in a longitudinally fixed position with respect to the second pole; and, (b) the first pole is longitudinally moveable with respect to the second pole to adjust the overall length of both poles.
}

Numerous benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 1 is a side assembly view of an extendable pole mechanism according to some embodiments of this invention.

FIG. 2 is a side view of a first housing portion.

FIG. 3 is a bottom view of the first housing portion shown in FIG. 2.

FIG. 4 is a side view of a second housing portion.

FIG. 5 is a top view of the second housing portion shown in FIG. 4.

FIG. 7 is a first side perspective view of a cam lever.

FIG. 8 is a second side perspective view of the cam lever shown in FIG. 7.

FIG. 9 is a first side perspective view of a cam holder.

FIG. 10 is a second side perspective view of the cam holder shown in FIG. 9.

IV. DETAILED DESCRIPTION

Figure 17:
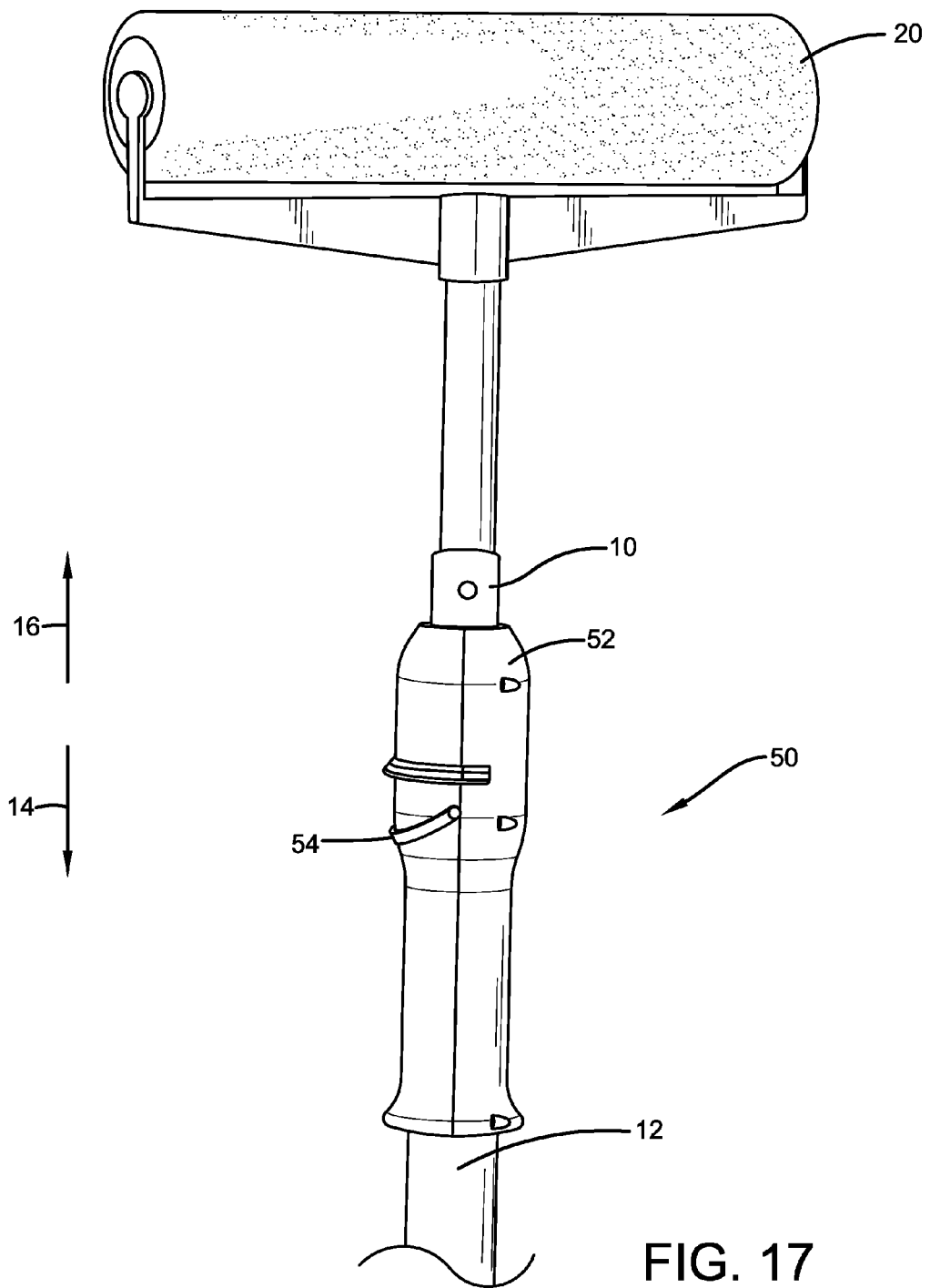
FIG. 17 is a side perspective view of the extendable pole mechanism connected to a point roller according to some embodiments of this invention.
Figure 18:
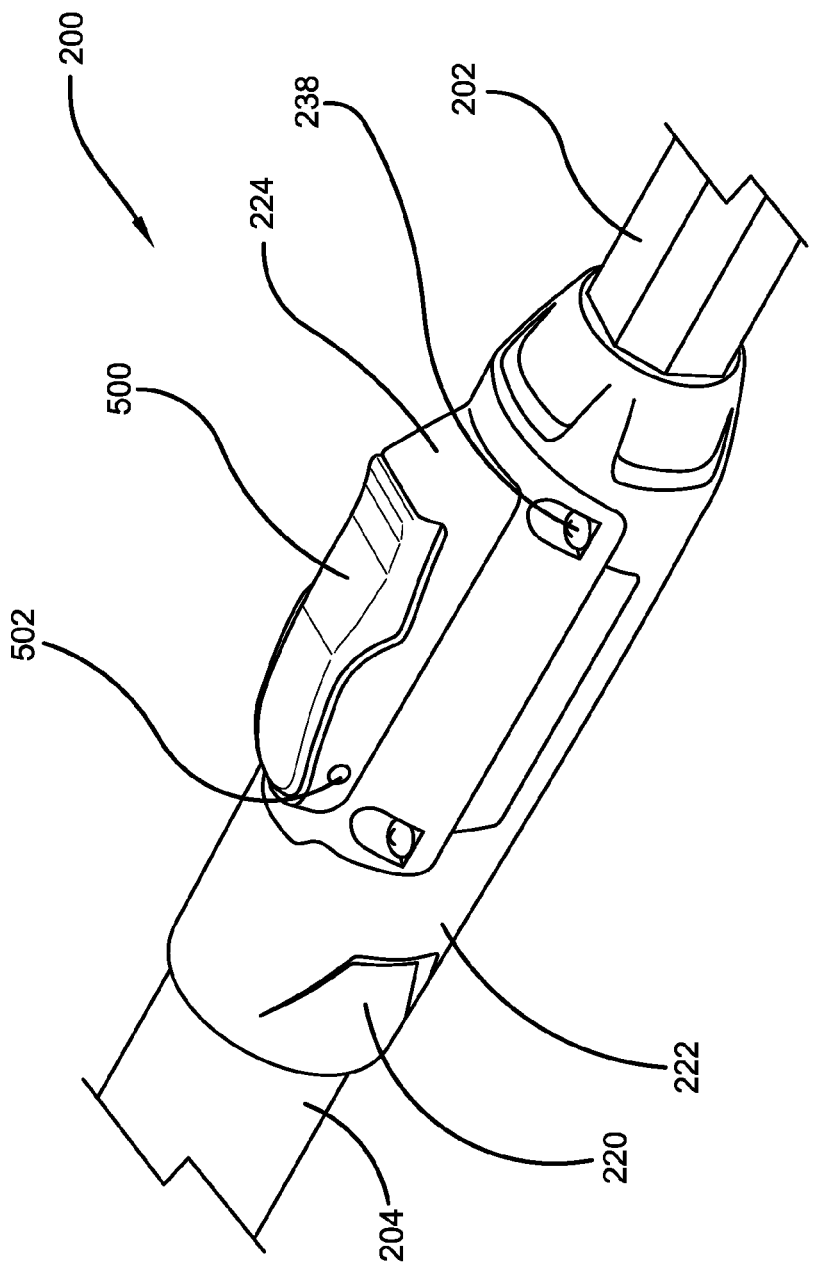
FIG. 18 is a perspective view of an extendable pole mechanism according to some embodiments of this invention with the full length of poles not shown for simplicity.

Referring now to the drawings wherein the showings are for purposes of illustrating embodiments of the invention only and not for purposes of limiting the same, and wherein like reference numerals are understood to refer to like components, FIGS. 1 and 17 show a pair of poles 10, 12 that can be used with the extendable pole mechanism 50 of this invention. While the extendable pole mechanism 50 is ideally suited for use with paint accessories and the like, such as the paint roller 20 shown in FIG. 17, it is not limited to that application. Pole 10 may have an outside diameter that is received within an inside diameter of pole 12. As a result, pole 10 is slideable within pole 12 (and with respect to pole 12) in first direction 14 and second direction 16. When pole 10 is slid in direction 14, the overall length of both poles is decreased. When pole 10 is slid in direction 16, the overall length of both poles is increased. Thus, a user can adjust the overall length of the poles by sliding pole 10 with respect to pole 12. Pole 10 may have a connection site 18 to which a paint accessory, such as paint roller 20, can be attached. Pole 12 and/or the housing may serve as a handle for the user. In one specific embodiment, pole 10 is made of aluminum and pole 12 is made of fiberglass to provide good performance.

With reference now to FIG. 1, the extendable pole mechanism 50 may be adjusted between a use condition, where pole 10 is held in a longitudinally fixed position with respect to pole 12, and an adjustment condition, where pole 10 can be slide longitudinally with respect to pole 12 so that the overall length can be changed. The extendable pole mechanism 50 may include a housing 52, a trigger 54, a cam lever 56, a cam holder 58, a push member 60, and a biasing device 62, which may be a spring, as shown. These components will now be described in more detail.

With reference now to FIGS. 1-5, the housing 52 may have first and second portions 64, 66 that receive portions of poles 12 and 14, as shown, and may be attached to each other using connectors 68 received in openings 70. While six threaded connectors are used in the embodiment shown, the number and type can be any chosen with the sound judgment of a person of skill in the art. The first housing portion 64 may include shaft receiving grooves 72, an external protection ring 74, internal lateral extensions 76 and an internal longitudinal extension 78. A groove 80 may be formed between some of the lateral extensions 76, as shown. The external protection ring 74 shown only extends a small amount around the external surface of the portion 64. The second housing portion 66 may include shaft receiving grooves 82 and an external protection ring 84 that may extend all the way around the external surface of the portion 66, as shown. The second housing portion 66 may have internal lateral extensions 86 and pole contact surfaces 88. Extensions 90 may define grooves 92 between them, as shown. The purposes for these components will be discussed below.

Figure 6:
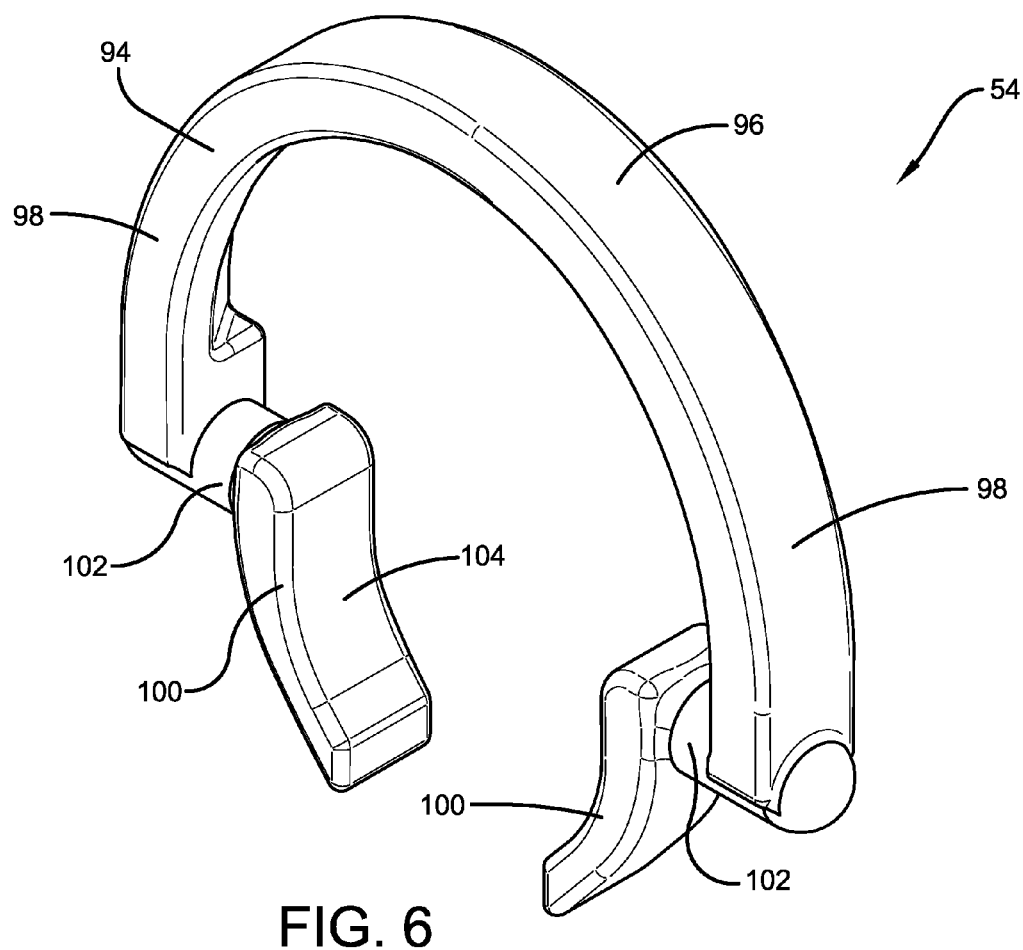
FIG. 6 is a perspective view of a trigger.
Figure 11:
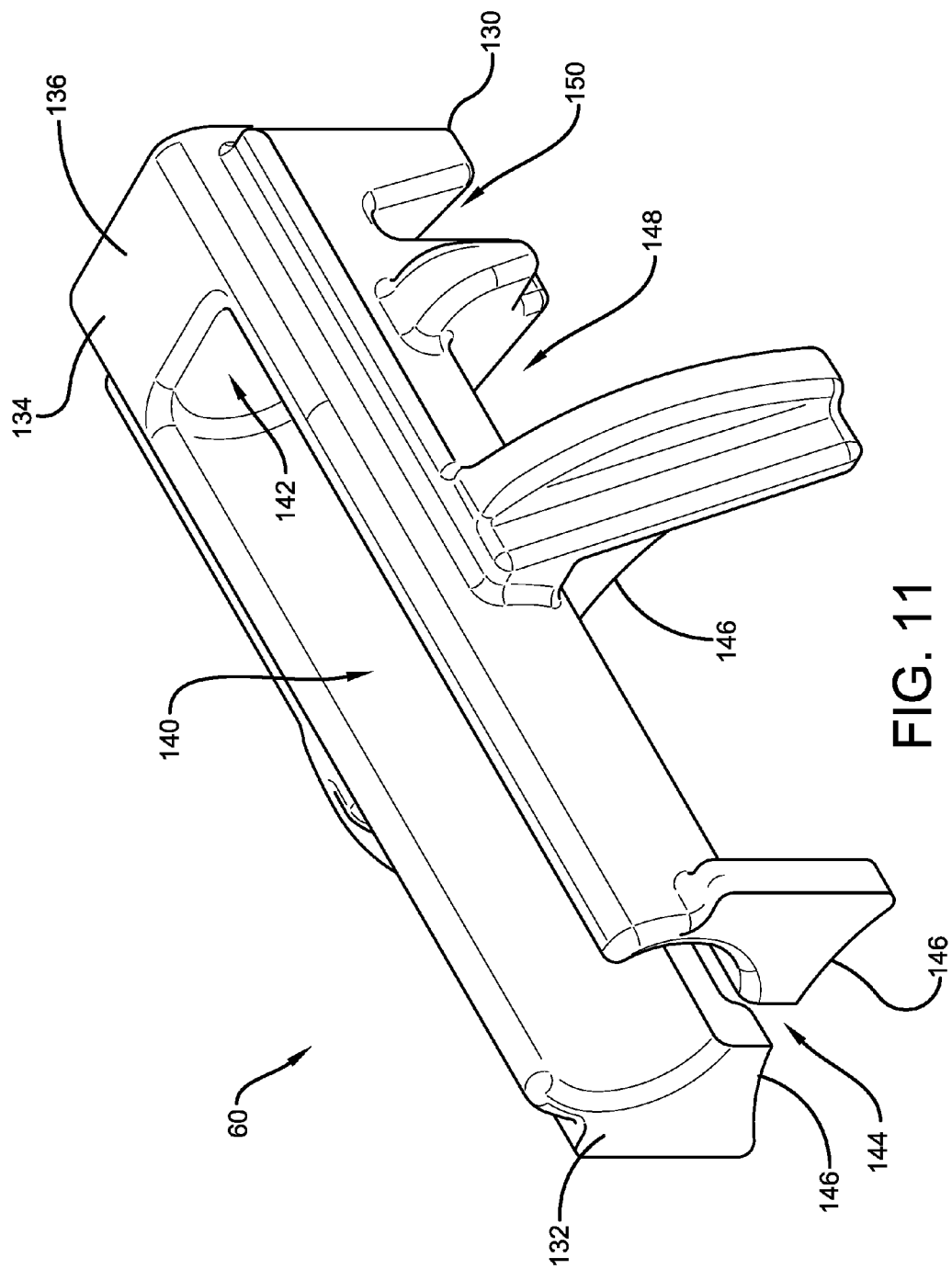
FIG. 11 is a top perspective view of a push member.
Figure 12:
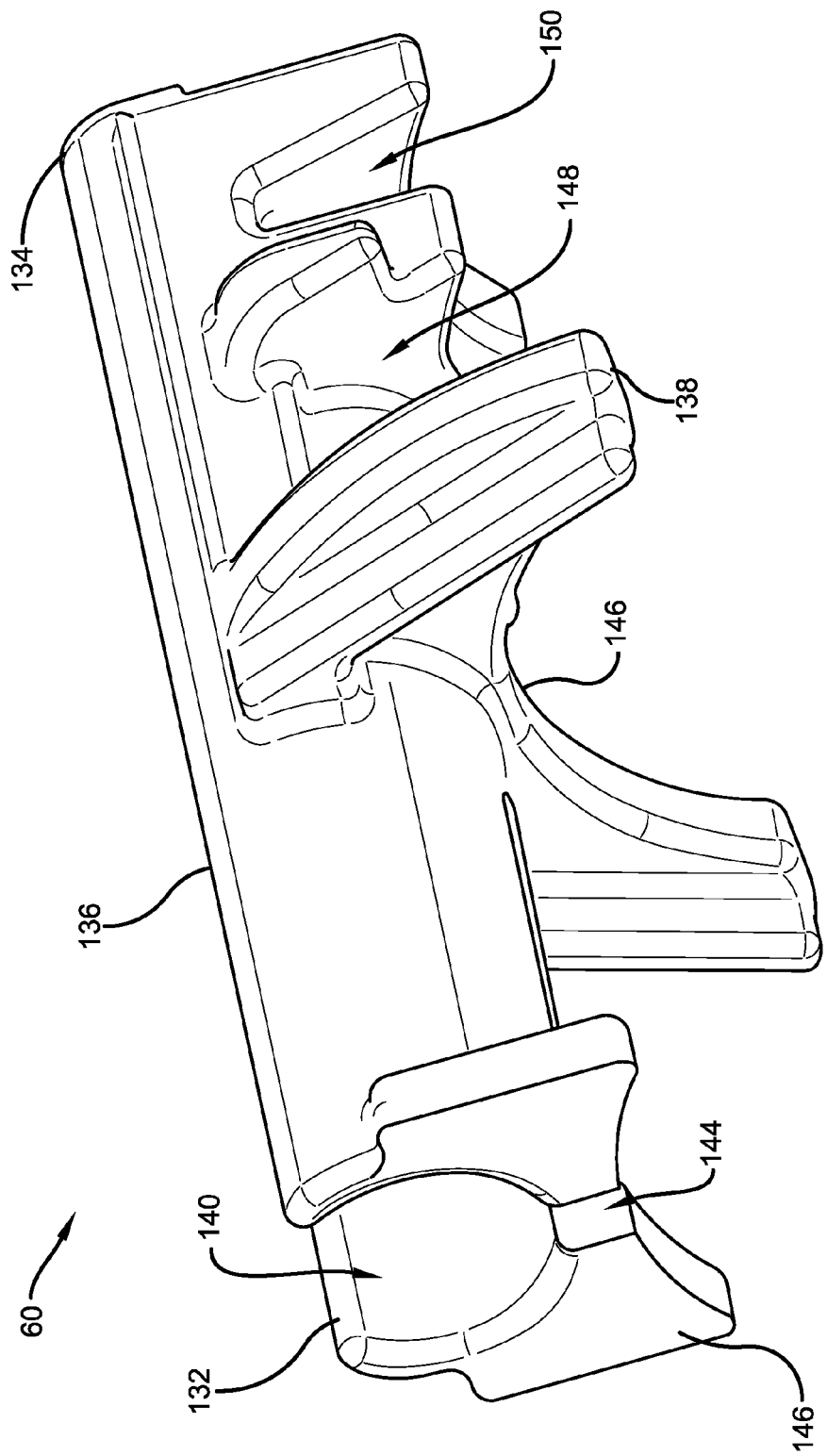
FIG. 12 is a bottom perspective view of the push member shown in FIG. 11.
Figure 13:
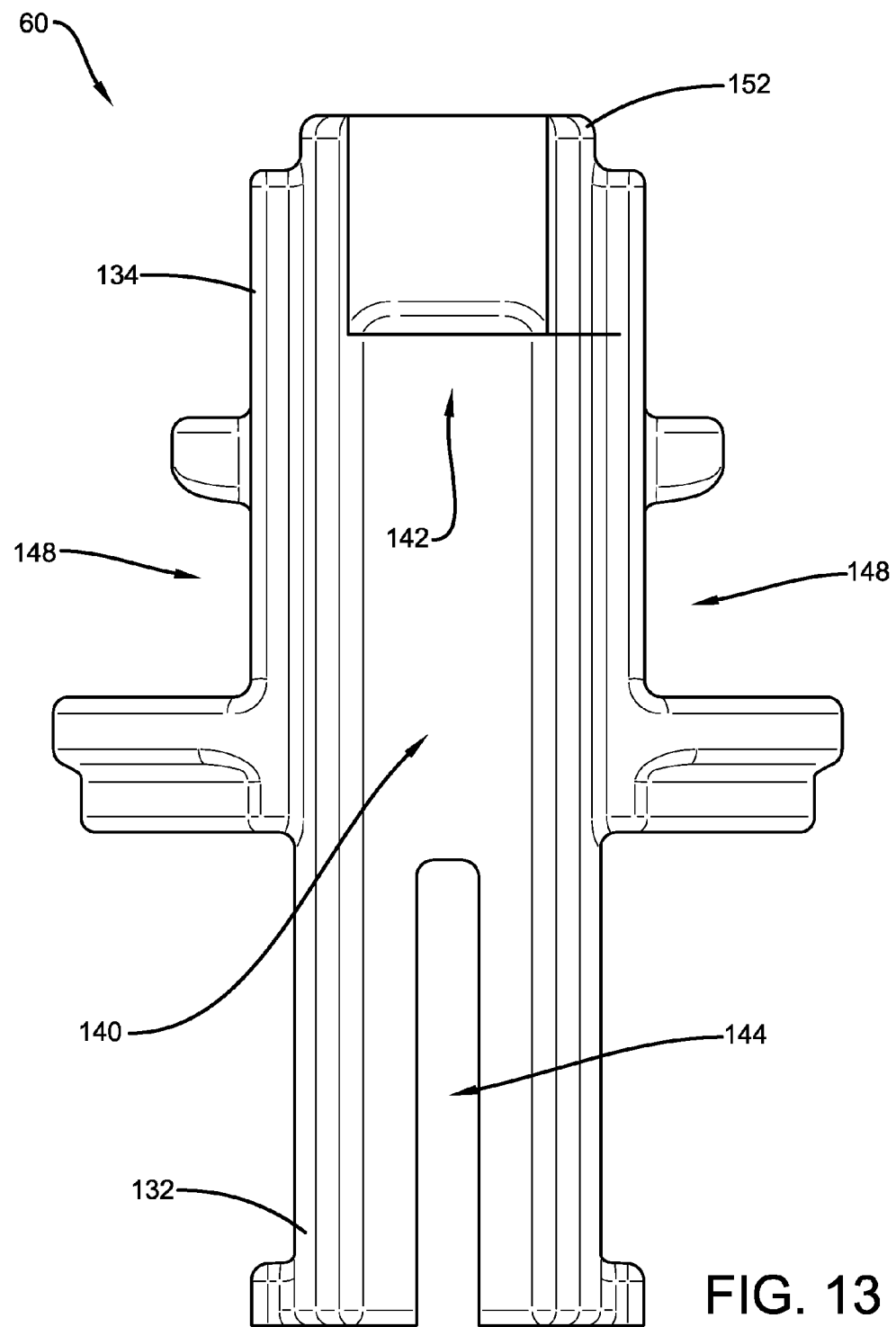
FIG. 13 is a top view of the push member shown in FIG. 11.
Figure 14:
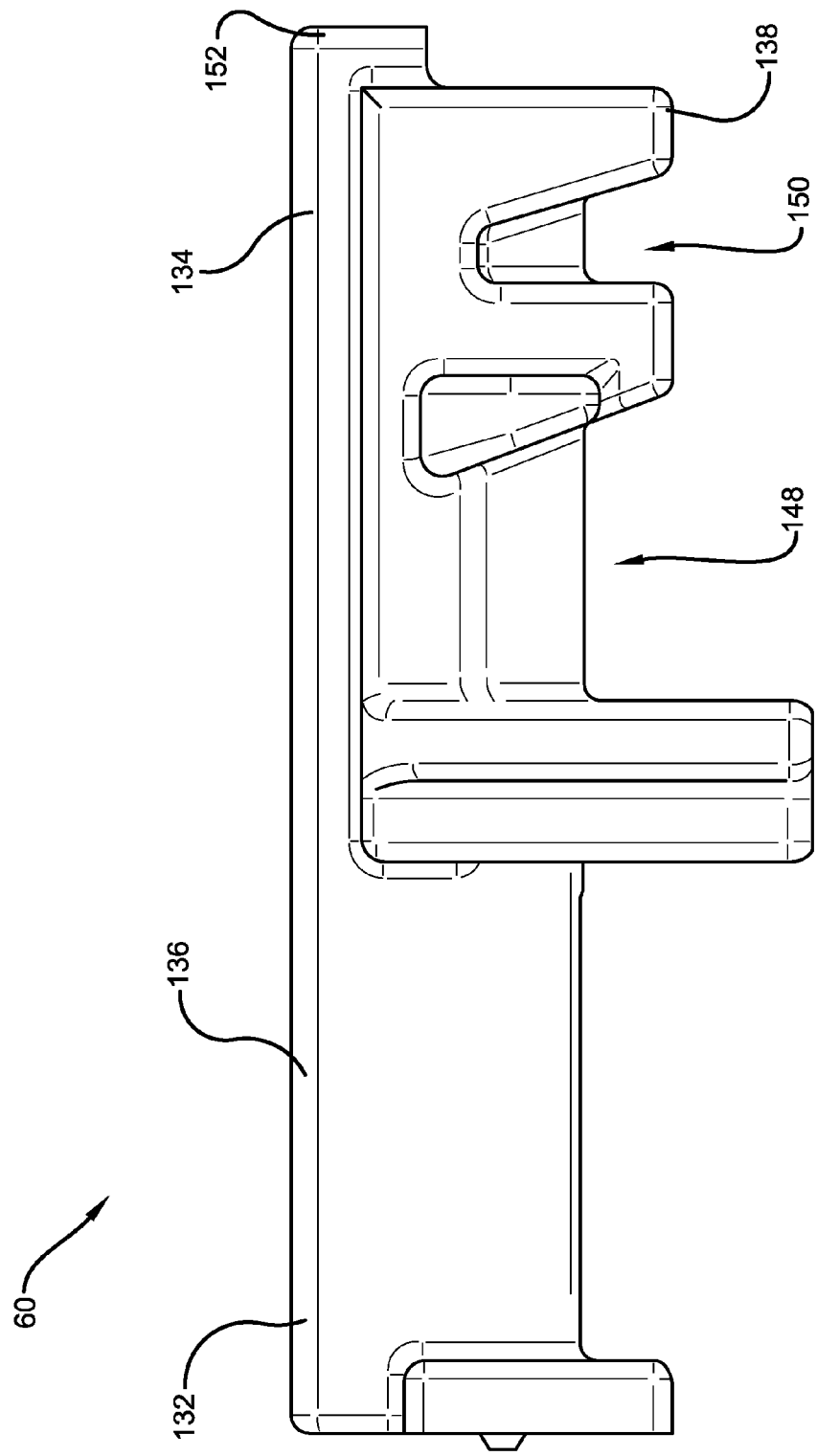
FIG. 14 is a side view of the push member shown in FIG. 11.

With reference now to FIGS. 1 and 6, the trigger 54 may have a body 94 having a mid-section 96 and a pair or arms 98, 98 extending from the mid-section 96. For the embodiment shown, the body 94 is C-shaped. A pair of hands 100, 100 may extend from distal ends of the arms 98, 98, as shown. The hands 100, 100 may extend inwardly and may have curved inner surfaces 104, as shown. A pair of shaft portions 102, 102 may extend from the distal ends of the arms 98, 98. For the embodiment shown, the hands 100, 100 are attached to the shaft portions 102, 102 and extend inwardly therefrom. The trigger 54 may be formed of any material chosen with the sound judgment of a person of skill in the art. In one embodiment, the trigger 54 is made of plastic and in another it is made of a metal.

With reference now to FIGS. 1 and 7-8, the cam lever 56 may have a body 106 having a mid-section 108 and a pair of arms 110, 110 extending from the mid-section 108. For the embodiment shown, the body 106 is C-shaped. First and second surfaces 112, 114 may extend longitudinally from the mid-section 108 as shown. The first surface 112 may extend above the second surface 114 and may be curved, as shown, to match the outside diameter of pole 10. Shoulder surfaces 116, 116, may be formed at proximal ends of the arms 110, 110 and the distal ends of the arms 110, 110 may curve inwardly, as shown. The cam lever 56 may be formed of any material chosen with the sound judgment of a person of skill in the art.

With reference now to FIGS. 1 and 9-10, the cam holder 58 may have a body 118 having a mid-section 120 and a pair or arms 122, 122 extending from the mid-section 120. For the embodiment shown, the body 118 is C-shaped. A pair of surfaces 124, 124 may define with the mid-section 120 a groove 126 on the external surface of the mid-section 120, as shown. Hands 128, 128 may extend longitudinally from distal ends of the arms 122, 122, as shown. Contact surfaces 130, 130 may be defined on the hands 128, 128. The contact surfaces 130, 130 may be J-shaped, as shown. The cam holder 58 may be formed of any material chosen with the sound judgment of a person of skill in the art.

With reference now to FIGS. 1 and 11-14, the push member 60 may have first and second ends 132, 134, a top 136 and a bottom 138. A chamber 140 may be provided on the top 136, first end 132 and may receive the biasing device 62 shown in FIG. 1. The chamber 140 may be defined by a wall 142 at one end and may have a generally cylindrical shape, as shown. A slot 144 may be formed in a surface defining the bottom of the chamber 140 and may extend from the first end 132 toward the mid-section of the push member 60. Pole contact surfaces 146, 146 may extend from the bottom 138 and may be curved, as shown, to match the outside diameter of pole 10. Grooves 148, 148 may be formed on sides of the push member 60 and a groove 150 may be formed on the bottom 138 of the push member 60, as shown. The second end 134 may have an extension 152. The push member 60 may be formed of any material chosen with the sound judgment of a person of skill in the art.

Figure 15:
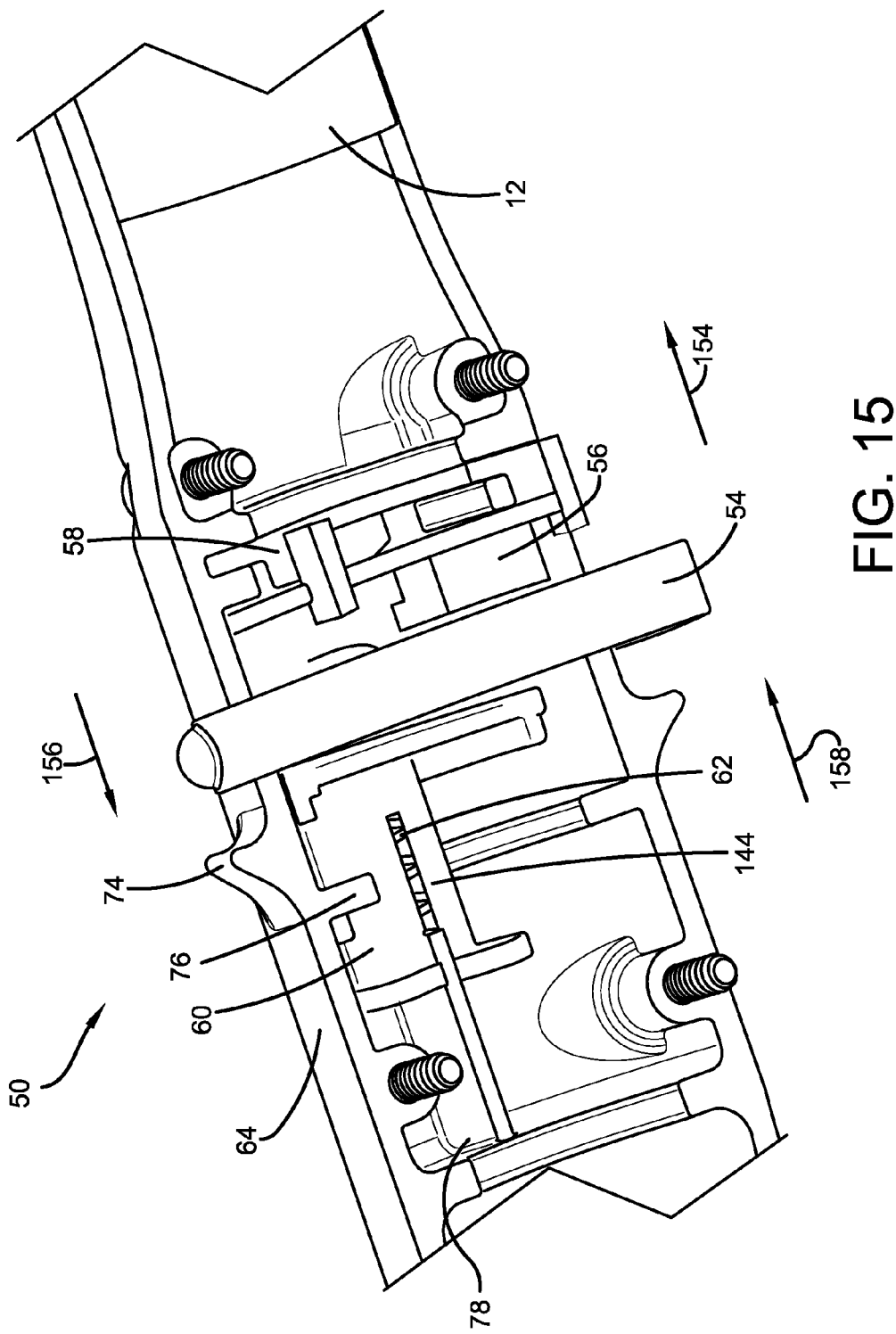
FIG. 15 is a bottom perspective view of the extendable pole mechanism in a use condition with the first pole and a portion of the housing hidden.
Figure 16:
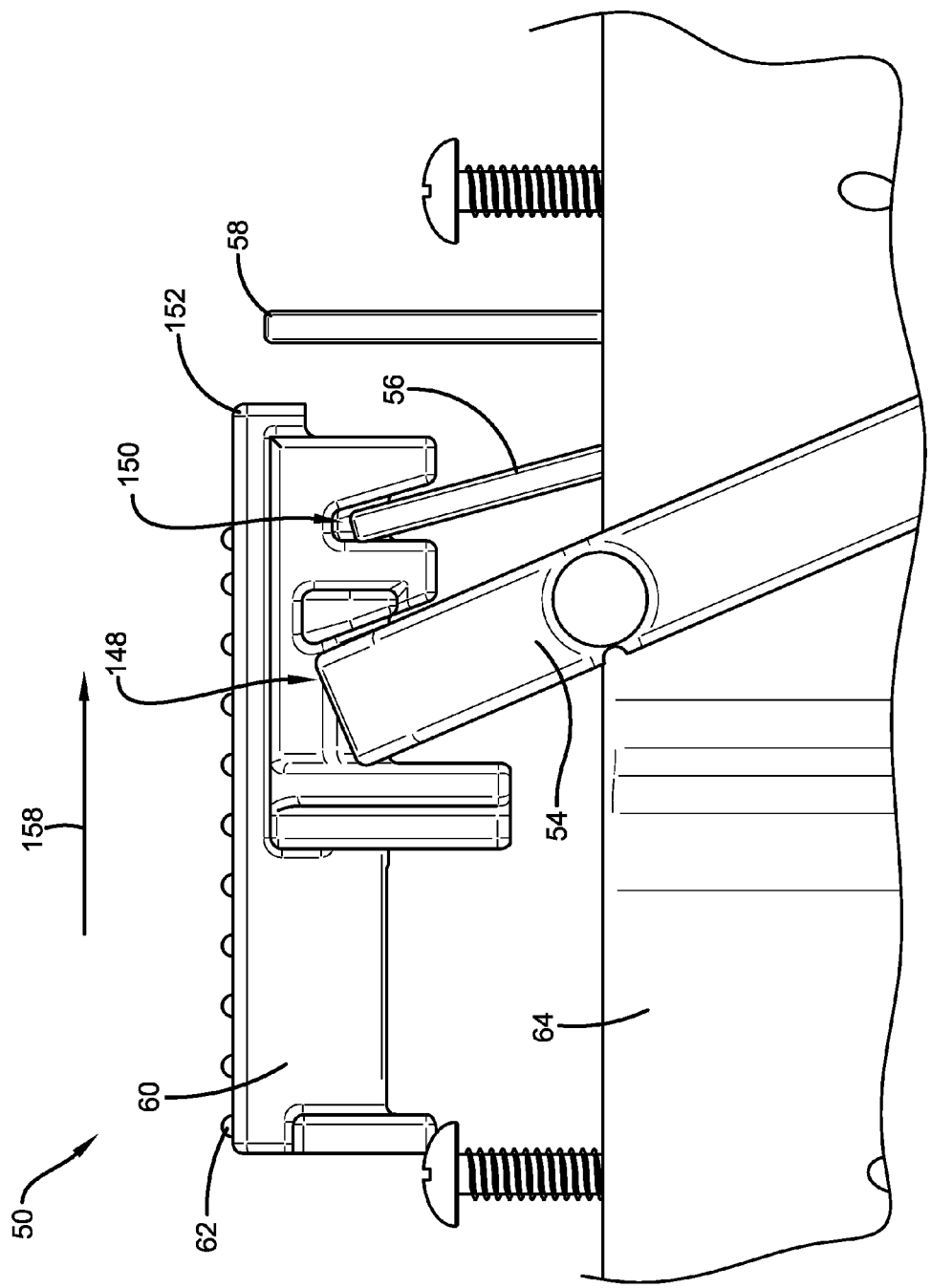
FIG. 16 is a side view of the extendable pole mechanism in an adjustment condition with the first pole and a portion of the housing hidden.

The assembly of the extendable pole mechanism 50 will now be described. The poles 10, 12 may be received in the housing portions 64, 66 as shown in FIGS. 1, 15 and 17. The push member 60 may be positioned primarily within the housing portion 64, between lateral extensions 76, as shown in FIG. 15, and the slot 144 may receive the extension 78. The pole contact surfaces 146 may receive the outer surface of the pole 10, though pole 10 is hidden in FIGS. 15 and 16. With reference to FIGS. 2-6 and 15-16, the shaft portions 102 of the trigger 54 may be received in the shaft receiving grooves 72 and 82 of the respective housing portions 64, 66. The hands 100 of the trigger 54, see FIG. 6, may be positioned within the grooves 148 formed on the push member 60, as seen in FIG. 16. The pole 10 may be received between the arms 98 of the trigger 54 and the mid-section 96 and arms 98 of the trigger 54 may be positioned outside the housing 52. The cam holder 58 may be positioned within the housing 52 with the mid-section 120, see FIGS. 9-10, received in the groove 80, see FIG. 3, formed in the first housing portion 64. This is shown in FIG. 15. The pole 10 may be received between the arms 122 of the cam holder 58. The hands 128 of the cam holder 58, see FIGS. 9-10, may be received in the grooves 92, 92, see FIG. 5, formed in the second housing portion 66. The cam holder 58 thus may be held substantially fixed throughout the operation of the extendable pole mechanism 50. This is shown in FIGS. 15 and 16. The cam lever 56 may be positioned within the housing 52 with the distal ends of the arms 110, 110, see FIGS. 7-8, received in the groove 150 formed on the push member 60, as shown in FIG. 16. The pole 10 may be received between the arms 110 of the cam lever 56. The shoulder surfaces 116, 116, see FIGS. 7-8, may be received on the contact surfaces 130 on the cam holder 58, see FIGS. 9-10 and 15.

With the extendable pole mechanism 50 assembled as described above, its operation will now be described. FIG. 15 shows the extendable pole mechanism 50 in the use condition where pole 10 is held in a longitudinally fixed position with respect to pole 12. This is generally the preferred condition for using the poles while painting, for example. In this use condition, the pole 10 is received between the arms 98 of the trigger 54, the arms 110 of the cam lever 56, and the arms 122 of the cam holder 58. Note that the arms 98 of the trigger 54, the arms 110 of the cam lever 56, and the arms 122 of the cam holder 58 are substantially parallel with each other and substantially perpendicular to the longitudinal axes of the poles 10, 12. Note also that the extension 152, see FIGS. 13-14 and 16, of the push member 60 may be received in the groove 126, see FIGS. 9-10, in the cam holder 58. In this use condition, the bottom of the pole 10 rests securely on the first surface 112 of the cam lever 56, see FIGS. 7-8.

To adjust the extendable pole mechanism 50 into the adjustment condition, shown in FIGS. 16 and 17, all the user has to do is move the mid-section of the trigger 54 in direction 154 shown in FIG. 15. This can easily be done with a single finger, perhaps the user's thumb. This motion causes the trigger 54 to pivot about its shaft portions 102, see FIG. 6. As the trigger 54 is pivoted, the hands 100 within the grooves 148 of the push member 60 push/slide the push member 60 in direction 156, shown in FIG. 15. As the push member 60 is moved in direction 156, the biasing force of the spring 62 is overcome as the extension 78 is received farther into the slot 144. Movement of the push member 60 in direction 156 also causes the distal ends of the arms 110, see FIGS. 7-8, which are received in groove 150 to move in direction 156. As the arms 110 move in this way, the shoulder surfaces 116, see FIGS. 7-8, pivot on the contact surfaces 130, see FIGS. 9-10, of the cam holder 58 (and thus with respect to the cam holder). This movement of the trigger 54, and thus the push member 60 and cam lever 56, may be continued until the adjustment condition shown in FIG. 16 is achieved.

With the extendable pole mechanism 50 in the adjustment condition shown in FIGS. 16 and 17, the pole 10 remains between the arms 98 of the trigger 54, the arms 110 of the cam lever 56, and the arms 122 of the cam holder 58. The arms of the trigger 54 and the cam lever 56, however, are no longer parallel with the arms of the cam holder 58 and are no longer perpendicular to the longitudinal axes of the poles 10, 12. In this adjustment condition, the bottom of the pole 10 contacts first and second surfaces 112, 114, see FIGS. 7-8, of the cam lever 56 and the pole contact surfaces 88, see FIG. 5, of the second housing portion 66. With the cam lever 56 angled in this manner, room for the pole 10 within the housing 52 is increased, making it very easy to adjust the relative longitudinal positions of the poles 10, 12 by sliding pole 10 with respect to pole 12 to change the overall length. In fact, if the user simply aims the pole 10 toward the ground while holding the housing 52 or the pole 12, gravity will easily cause the pole 10 to slide out of the housing 52 and pole 12 (in direction 16 in FIG. 1), increasing the overall length. Similarly, if the user simply aims the pole 10 toward the sky while holding the housing 52 or the pole 12, gravity will easily cause the pole 10 to slide into the housing 52 and pole 12 (in direction 14 in FIG. 1), decreasing the overall length.

To adjust the extendable pole mechanism 50 from the adjustment condition shown in FIGS. 16 and 17 to the use condition shown in FIG. 15, all the user has to do is release the trigger 54. When the trigger 54 is released, the biasing force of the spring 62 will force/slide the push member 60 in direction 158, shown in FIGS. 15 and 16 until the components return to the relative positions shown in FIG. 15.

With reference now to FIGS. 18-20 and 29, an extendable pole mechanism 200 according to other embodiments is disclosed. The extendable pole mechanism 200 may be used with a first pole 202 (only a portion shown) that is longitudinally movable with respect to a second pole 204 (only a portion shown) to adjust the overall length of both poles. The second pole 204 may have an outer diameter that is greater than the outer diameter of the first pole 202 and may have a longitudinally extending opening that receives the first pole 202. As a result, the first pole 202 may be moved longitudinally within the second pole 204. The extendable pole mechanism 200 may include a housing 220, first and second contact devices 300, 350, first and second levers 400, 450, and a trigger 500. These components and their operation will be described below.

With reference now to FIGS. 18-22 and 29, while the housing 220 used with this invention can be of any style and size chosen with the sound judgment of a person of skill in the art, for the embodiment shown, the housing 220 may comprise a first housing portion 222 and a second housing portion 224. The first housing portion 222 may have a longitudinally extending opening 226 that receives the first and second poles 202, 204, as shown. A shoulder 228, referenced in FIGS. 20 and 29, may limit the distance the second pole 204 can be inserted into the housing 220. The first pole 202 may, depending on the amount of extension, extend through both ends of the first housing portion 222. The second housing portion 222 may attach to the second housing portion 224 to enclose the poles. While this attachment may be any chosen with the sound judgment of a person of skill in the art, for the embodiment shown the first housing portion 222 has a pair of convex features 230 (referenced in FIG. 29) that are received in matching concave features 232 (referenced in FIG. 22) formed on the second housing portion 224. One or more connectors 238, four shown, may be received in connector holes and used to secure the housing portions 222, 224 together.

Figure 19:
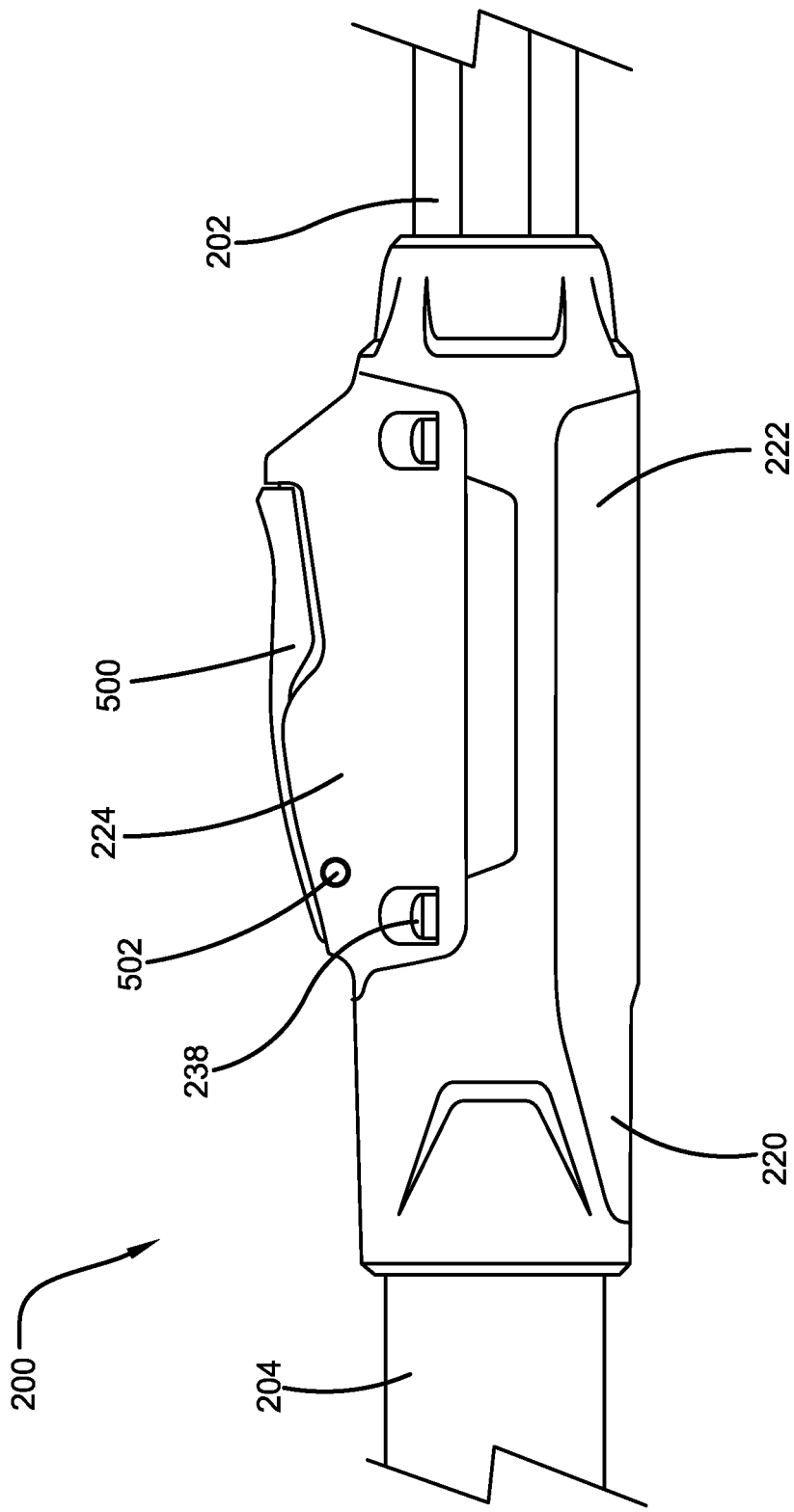
FIG. 19 is a side view of the extendable pole mechanism shown in FIG. 18.
Figure 20:
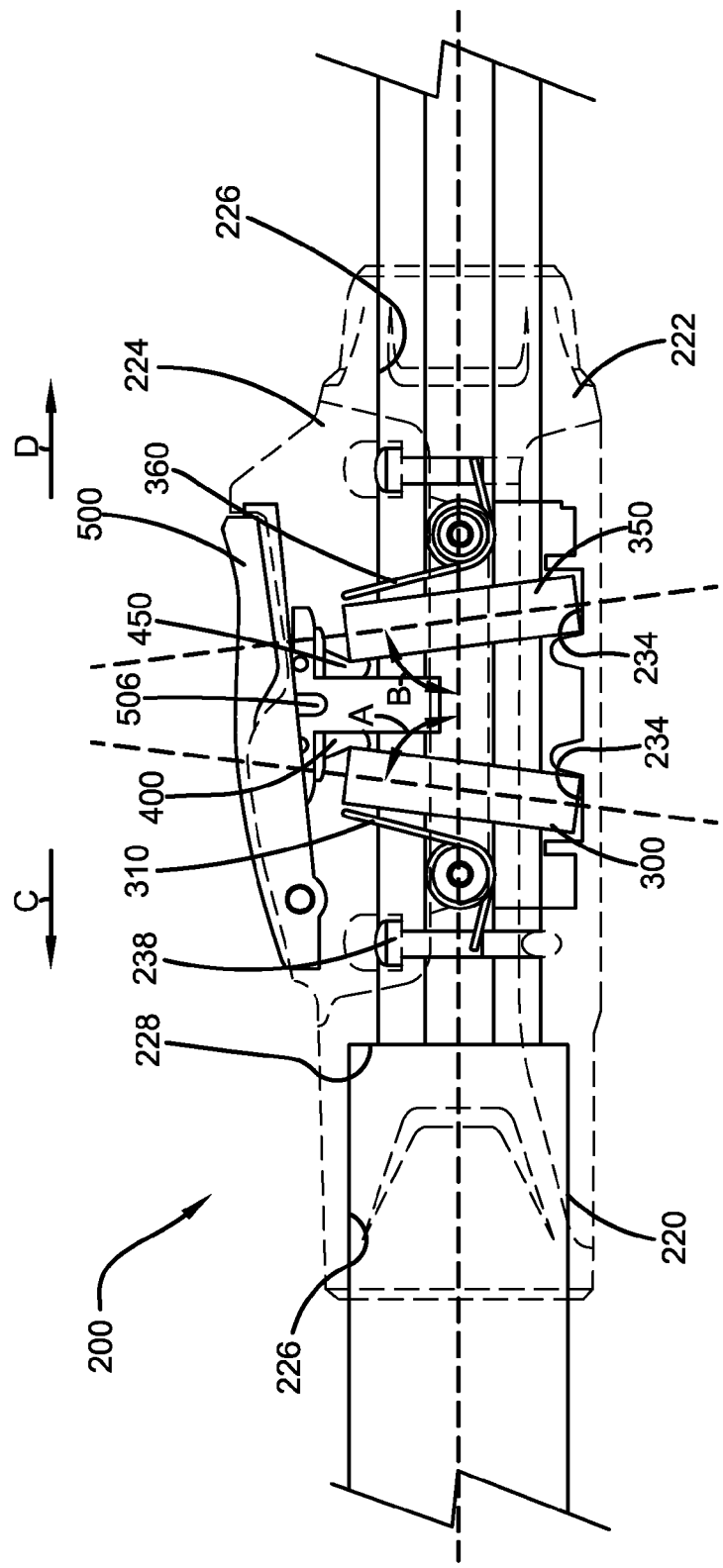
FIG. 20 is a view similar to that shown in FIG. 19 but with components shown as being transparent so that the internal workings can be visualized.
Figure 21:
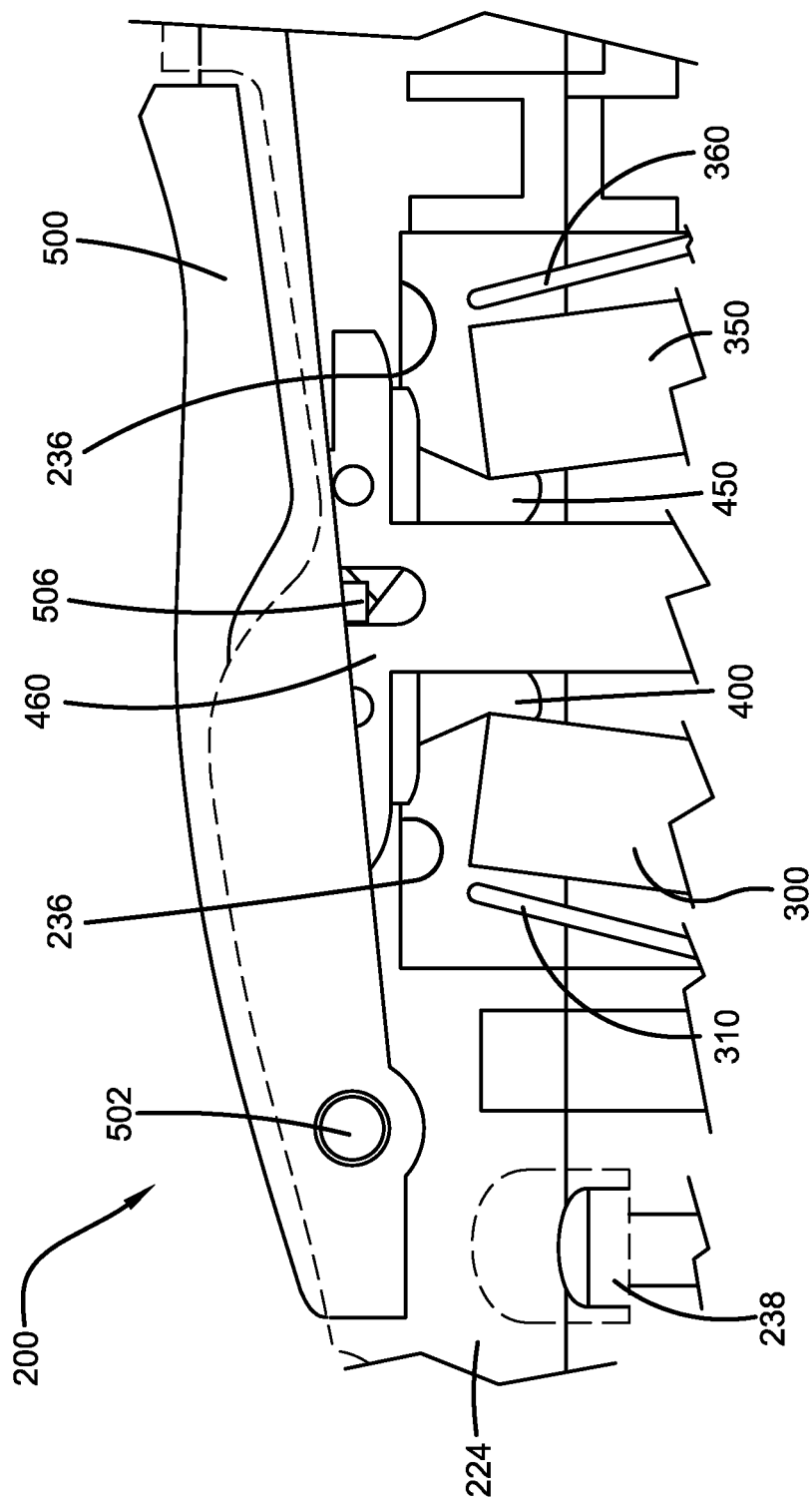
FIG. 21 is a close up view of a portion of the extendable pole mechanism shown in FIG. 20.
Figure 22:
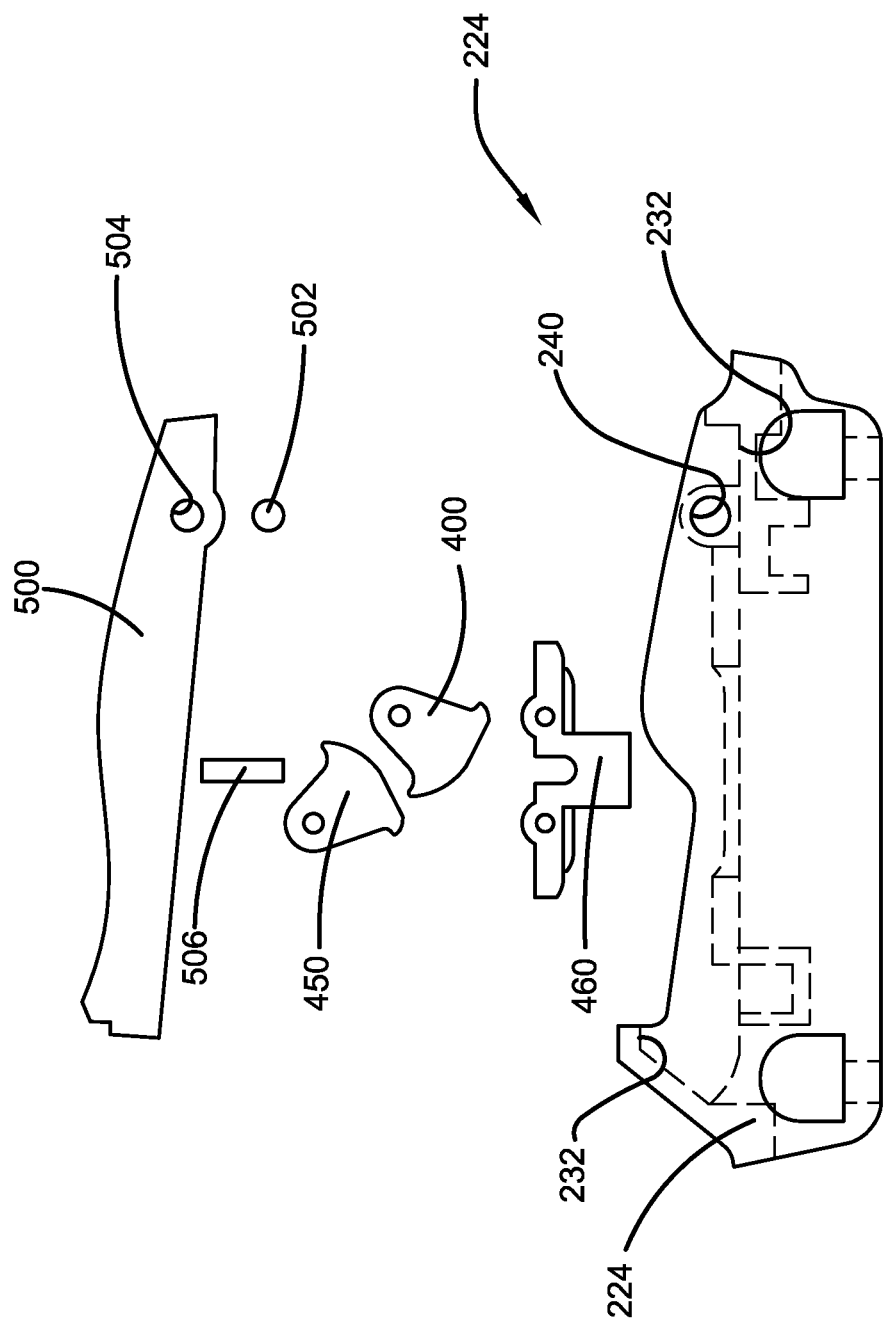
FIG. 22 is an assembly view of some components of the extendable pole mechanism shown in FIG. 18.
Figure 23:
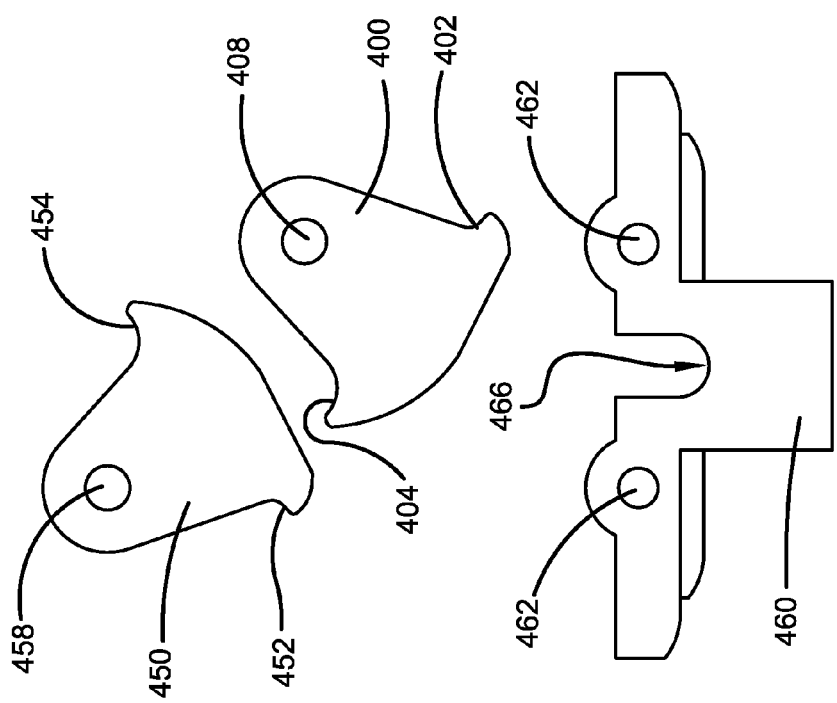
FIG. 23 is a close up view of some of the components shown in FIG. 22.
Figure 24:
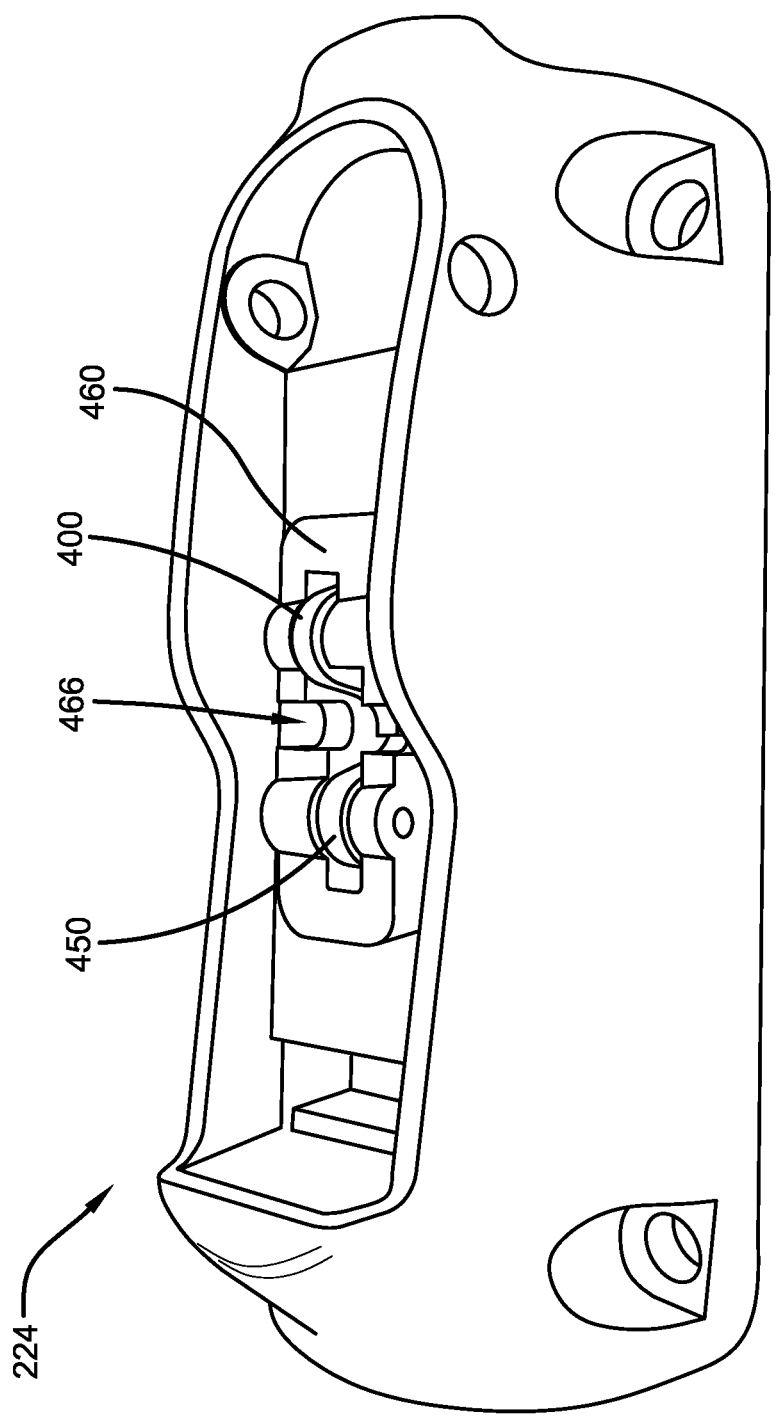
FIG. 24 is a perspective side view of the second housing portion.
Figure 25:
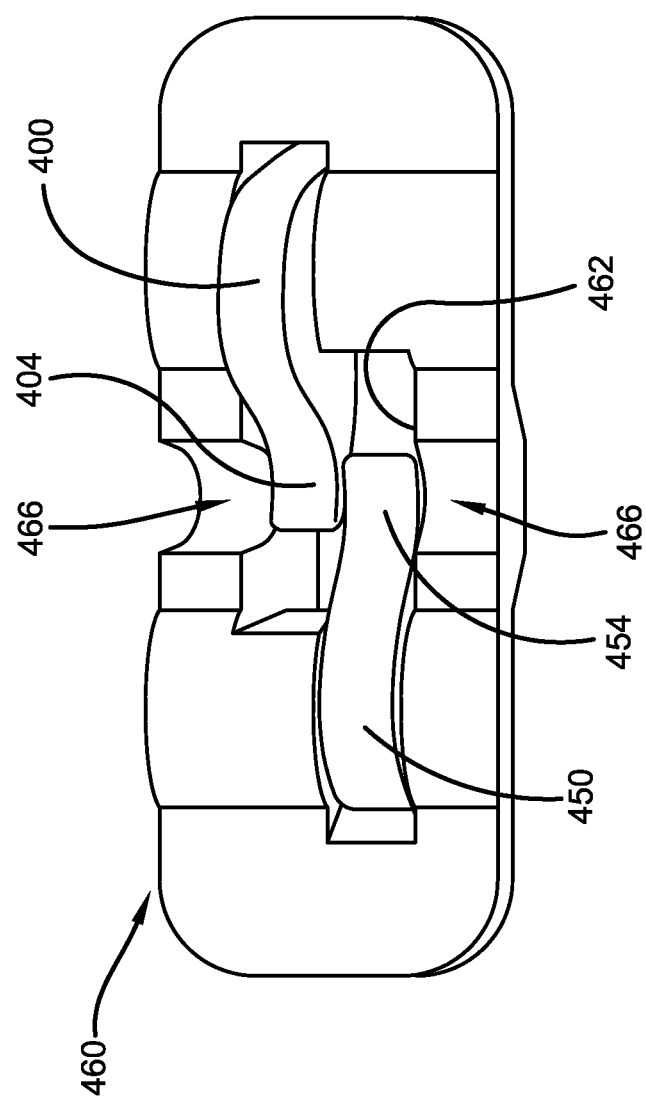
FIG. 25 is a top view of a lever support device.
Figure 26:
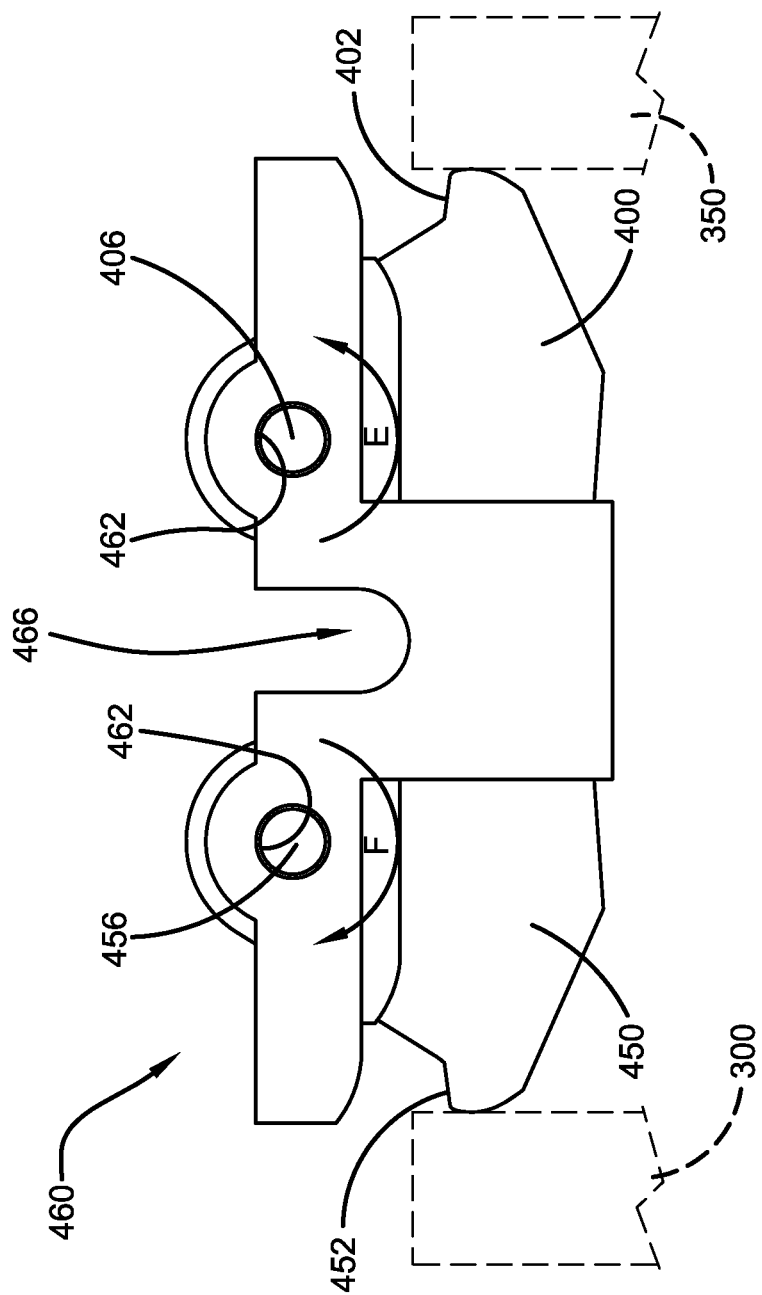
FIG. 26 is a side view of the lever support device shown in FIG. 25.
Figure 27:
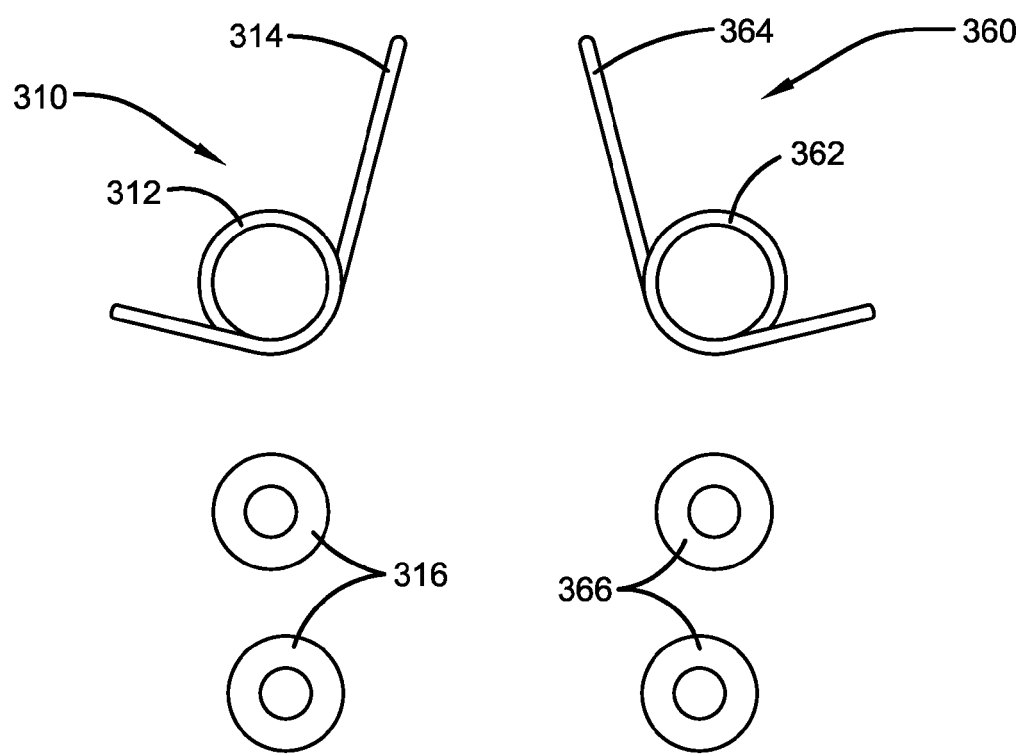
FIG. 27 is an assembly view of some components of the extendable pole mechanism shown in FIG. 18.

With reference now to FIGS. 19-21, the first and second contact devices 300, 350 may be adjusted between a use condition where they contact the first pole 202 to hold the first pole 202 is a longitudinally fixed position with respect to the second pole 204 and an adjustment condition where the contact devices 300, 350 do not hold the first pole 202 in a longitudinally fixed position with respect to the second pole 204. As a result, in the adjustment condition the first pole 202 is longitudinally moveable with respect to the second pole 204 to adjust the overall length of both poles. FIGS. 20 and 21 show the contact devices 300, 350 in the use condition where the angles A, B between the longitudinal axis of the first pole 202 and the radii of the contact devices 300, 350 contact the first pole 202 to prevent relative movement of the first pole 202 with respect to the second pole 204. The adjustment condition is not as shown in FIG. 26 is achieved when the angles A, B are right angles (90 degrees) or approximately right angles. For the embodiment shown, right angle A is achieved by moving the top portion of the contact device 300 in direction C and right angle B is achieved by moving the top portion of the contact device 350 in direction D. For the embodiment shown, direction C is opposite to direction D. When the angles A, B are right angles the contact devices 300, 350 do not contact the first pole 202 or only slightly contact the first pole 202 so that the first pole 202 is longitudinally moveable with respect to the second pole 204.

Figure 28:
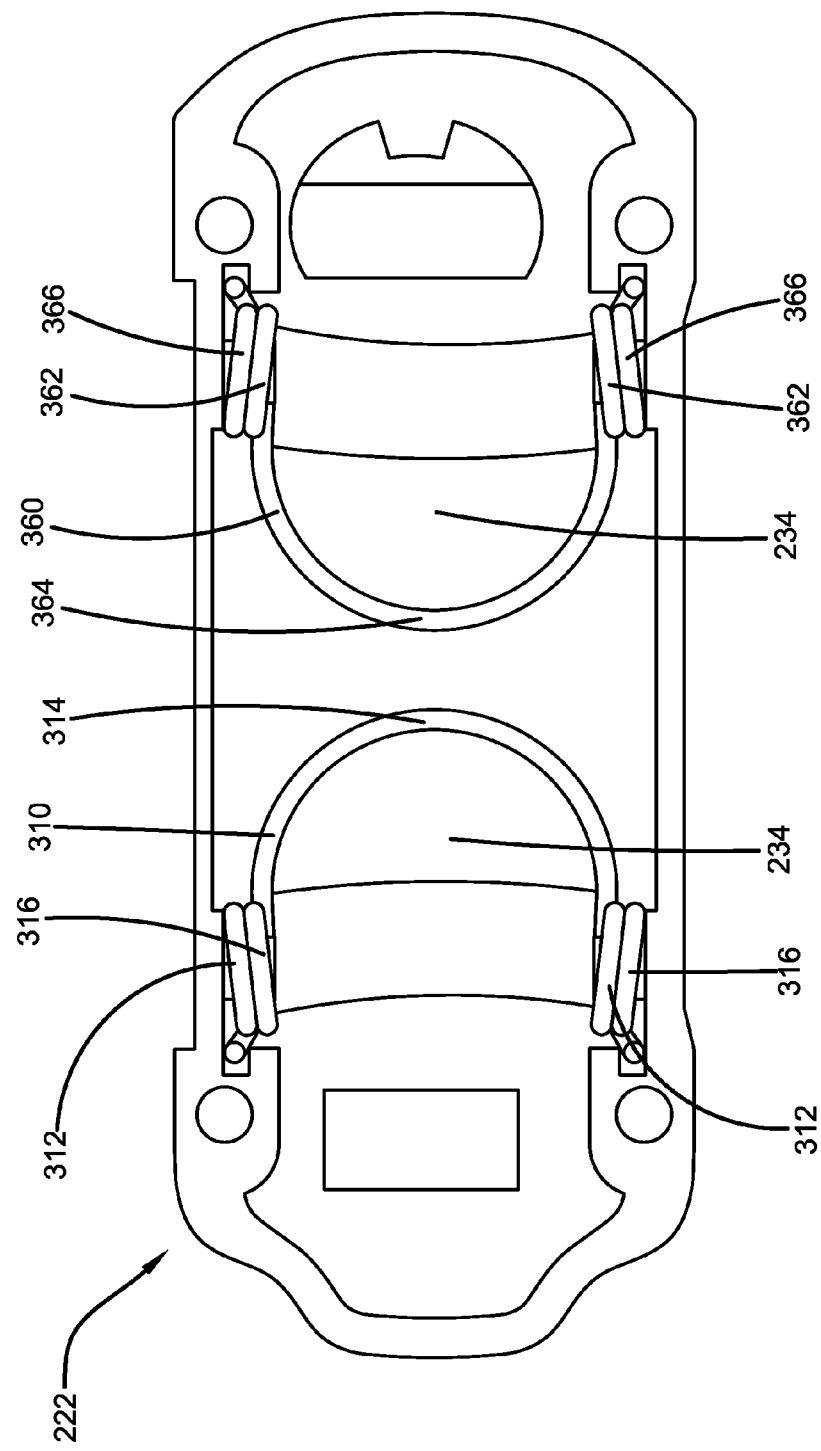
FIG. 28 is a top view of the first housing portion with components removed so the biasing devices can be seen.
Figure 29:
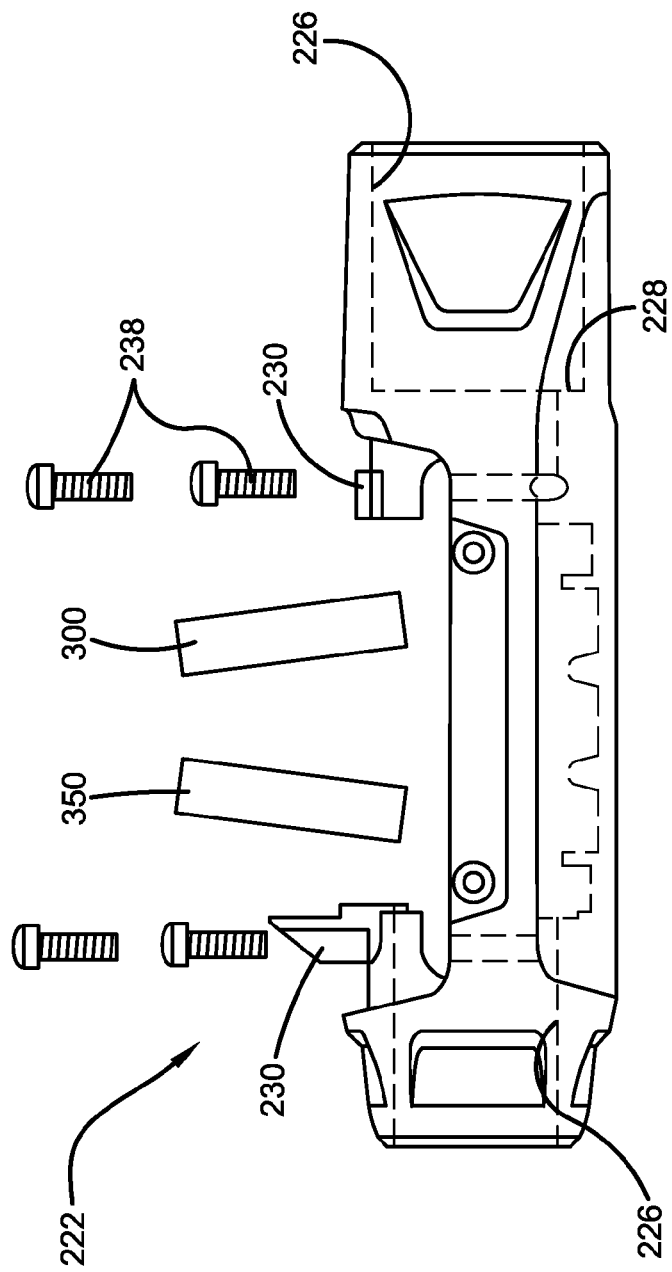
FIG. 29 is an assembly view of some components of the extendable pole mechanism shown in FIG. 18.
Figure 30:
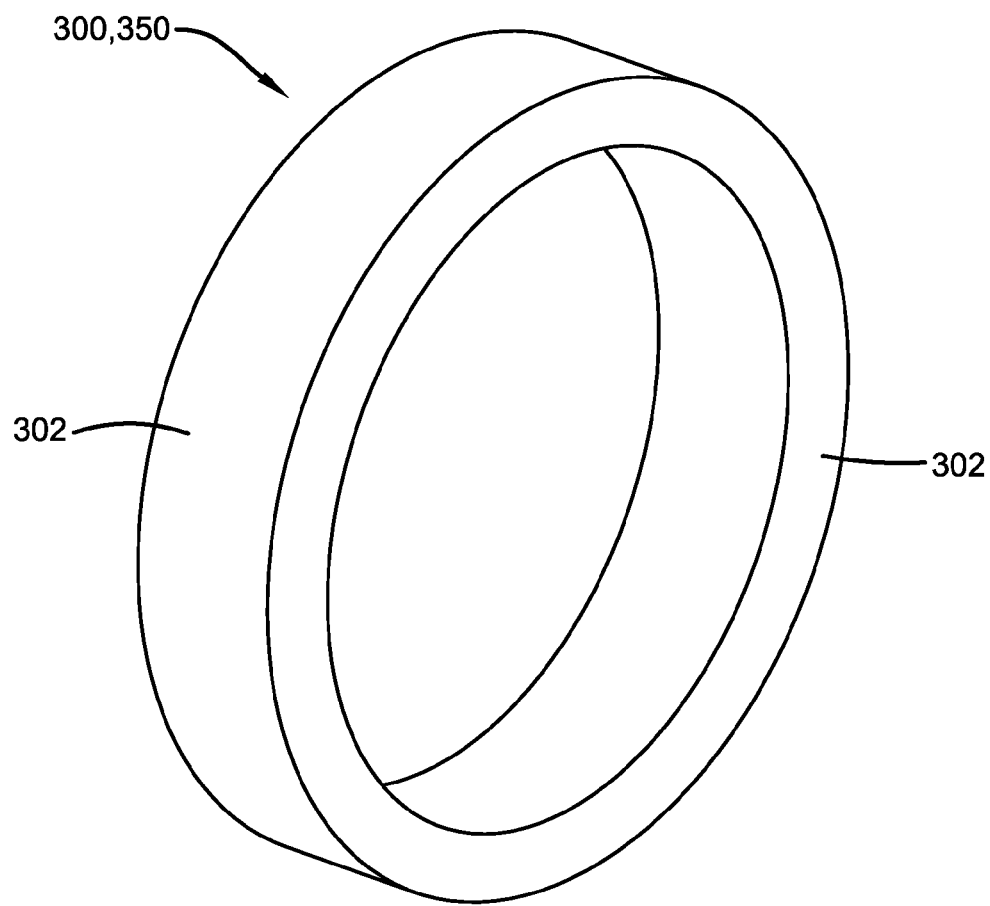
FIG. 30 is a side perspective view of a contact device.

With reference now to FIGS. 20-21 and 29-30, the contact devices 300, 350 may each have a pair of arms 302, 302 that receive the first pole 202. The contact devices 300, 350 may be supported to the housing 220 and may be movable with respect to the housing 220 between the use condition and the adjustment condition. In one specific embodiment, the first housing portion 222 may have a pair of housing slots 234 (referenced in FIGS. 20 and 28) that receive the contact devices 300, 350 and that permit the contact devices 300, 350 to pivot therein between the use condition and the adjustment condition. The second housing portion 224 may also have a pair of housing slots 236 (referenced in FIG. 21) that receive the contact devices 300, 350 and that permit the movement of the contact devices 300, 350. In one specific embodiment, seen best in FIGS. 29 and 30, the contact devices 300, 350 may be ring shaped and may be identical in size and shape. This makes it easy to supply and install the contact devices 300, 350.

With reference now to FIGS. 20-21 and 27-28, for the embodiment shown, biasing devices 310, 360 may be used to exert a biasing force to bias the contact devices 300, 350, respectively, toward a desired position. For the embodiment shown, the biasing devices 310, 360 bias the contact devices 300, 350 toward contact with the first pole 202 and thus bias the contact devices 300, 350 into the use condition. With reference to FIG. 20, the biasing device 310 thus biases the top of contact device 300 in direction D and the biasing device 360 thus biases the top of contact device 350 in direction C. While the biasing devices used can be of any type chosen with the sound judgment of a person of skill in the art, for the embodiment shown the biasing devices 310, 360 are torsion springs each having a pair of coils 312, 362 connected together by mid-sections 314, 364. The coils 312, 362 may be received around bushings 316, 366 mounted to the housing 220. The mid-sections 314, 364 may be curved to match the contact devices 300, 350 to increase the contact between the mid-sections 314, 364 and the contact devices 300, 350. Portions of the mid-sections 314, 364 may be received within the housing slots 236, as shown.

With reference now to FIGS. 20-26, the levers 400, 450 may be used to cause the contact devices 300, 350 to move between the use condition and the adjustment condition. While the levers 400, 450 can be of any type and size chosen with the sound judgment of a person of skill in the art, for the embodiment shown each lever 400, 450 is supported to the housing 220 and is moveable with respect to the housing 220. In a specific embodiment, the levers 400, 450 may pivot with respect to the housing 220. Lever 400 may have first and second contact surfaces 402, 404 and may pivot about pivot pin 406 that is received in lever opening 408. Lever 450 may similarly have first and second contact surfaces 452, 454 and may pivot about pivot pin 456 that is received in lever opening 458. The levers 400, 450 may be supported to the housing 220 using lever support device 460. Lever support device 460 may have a pair of lever support openings 462, 462 that receive the pivot pins 406, 456 and a lever support aperture 464 (referenced in FIG. 25) through which the levers 400, 450 extend. Lever support device 460 may also have a lever support channel 466 used as described below. The lever support device 460 may be received, such as with an interference fit, within an opening formed in the second housing portion 224.

With reference now to FIGS. 18-22, the trigger 500 may be moved by a user to cause the first and second levers 400, 450 to move with respect to the housing 220 to cause the first and second contact devices 300, 350 to move with respect to the housing 220 between the use condition and the adjustment condition. The trigger 500 may be supported to the housing 220 and moveable with respect to the housing 220 in any manner chosen with the sound judgment of a person of skill in the art to cause the levers 400, 450 to move as just described. For the embodiment shown, the trigger may pivot with respect to the housing about pivot pin 502 that may be received in a trigger opening 504 (referenced in FIG. 22) formed in the trigger 500 and in a housing aperture 240 (also referenced in FIG. 22) formed in the second housing portion 224. The trigger 500 may have a lever contact device 506 that may be positioned within the lever support channel 466 and used to contact the levers 400, 450.

With reference now to all the FIGURES, operation of the extendable pole mechanism 200 will now be described. Because of the biasing forces of the biasing devices 310, 360, the contact devices 300, 350 are biased into the use condition, shown in FIGS. 18-21. As a result, the user can use the poles 202, 204 that are attached to the extendable pole mechanism 200 in a relatively longitudinally fixed position which is appropriate, for example, when painting. If the user desires to change the relative positions of the poles 202, 204, and thus the overall length of both poles the user may adjust the extendable pole mechanism 200 into the adjustment condition. This can be accomplished simply by applying a manual force, such as with the user's thumb, onto the outer surface of the trigger 500. This manual force causes the trigger 500 to pivot about pivot pin 502 so that the lever contact device 506 moves (downward in the figures) in lever support channel 466. This movement causes the lever contact device 506 to apply a force to the second contact surfaces 404, 454 of the levers 400, 450 which causes the levers 400, 450 to pivot about respective pivot pins 406, 456 in directions E and F as shown in FIG. 26. Note that in this embodiment the levers 400, 450 pivot in opposite directions. As the levers 400, 450 pivot, their first contact surfaces 402, 452 contact and apply a force to the contact devices 300, 350, respectively. This force on the contact devices 300, 350 overcomes the biasing forces of the biasing devices 310, 360 and moves the contact devices 300, 350 into positions where angles A, B, referenced in FIG. 20, are right angles or approximately right angles. In this position, the contact devices 300, 350 do not contact or only slightly contact the first pole 202. As a result, the first pole 202 can be easily longitudinally moved with respect to the second pole 204 to adjust the overall length of both poles. The user may be able to make this overall pole length adjustment using only one hand where the thumb (or other finger) on the one hand maintains a force on the trigger 500. Once the desired overall pole length has been achieved, the user need only remove the manual force from the trigger 500. Once this manual force is removed, the biasing forces of the biasing devices 310, 360 force the contact devices 300, 350 into the use condition where the poles 202, 204 are placed in a longitudinally fixed position.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. An extendable pole mechanism for use with a first associated pole that is longitudinally movable with respect to a second associated pole to adjust the overall length of both poles, the extendable pole mechanism comprising:
   a housing configured to receive the first and second associated poles;
   a first contact device mounted in supported relationship to the housing and moveable with respect to the housing;
   a second contact device mounted in supported relationship to the housing and moveable with respect to the housing;
   a first lever mounted in supported relationship to the housing and moveable with respect to the housing;
   a second lever mounted in supported relationship to the housing and moveable with respect to the housing;
   a trigger mounted in supported relationship to the housing and moveable with respect to the housing; and,
   wherein the extendable pole mechanism is adjustable by moving the trigger with respect to the housing to cause the first and second levers to move with respect to the housing to cause the first and second contact devices to move with respect to the housing between: (1) a use condition where portions of each of the first and second contact devices are arranged toward one another and are not parallel with each other; and, (2) an adjustment condition where the portions of each of the first and second contact devices are each arranged at right angles or approximately right angles relative to the first and second associated poles,
   wherein the first lever pivots in a first direction with respect to the housing to cause the first contact device to move with respect to the housing between the use condition and the adjustment condition and
   wherein the second lever pivots in a second direction with respect to the housing that is substantially opposite to the first direction to cause the second contact device to move with respect to the housing between the use condition and the adjustment condition.

2. The extendable pole mechanism of claim 1 further comprising:
   a first biasing device that exerts a first biasing force that biases the first contact device toward the use condition; and,
   a second biasing device that exerts a second biasing force that biases the second contact device toward the use condition.

3. The extendable pole mechanism of claim 2 wherein:
   the first biasing device biases the first contact device in a first direction; and,
   the second biasing device biases the second contact device in a second direction that is substantially opposite the first direction.

4. The extendable pole mechanism of claim 2 wherein:
   the first biasing device is a first spring comprising first and second coils connected together by a mid-section;
   the second biasing device is a second spring comprising first and second coils connected together by a mid-section;
   the mid-section of the first spring contacts the first contact device to bias the first contact device; and,
   the mid-section of the second spring contacts the second contact device to bias the second contact device.

5. The extendable pole mechanism of claim 1 wherein:
   the first lever: (1) comprises first and second contact surfaces; and, (2) is pivotal with respect to the housing;
   the second lever: (1) comprises first and second contact surfaces; and, (2) is pivotal with respect to the housing;

the trigger: (1) comprises a lever contact device; and, (2) is pivotal with respect to the housing; and, wherein the extendable pole mechanism is adjustable by pivoting the trigger with respect to the housing to cause the lever contact device to contact the first contact surfaces of the first and second levers to cause the second contact surfaces of the first and second levers to contact the first and second contact devices, respectively, to cause the first and second contact devices to move with respect to the housing between the use condition and the adjustment condition.

6. The extendable pole mechanism of claim 1 wherein:
the housing comprises first and second housing slots and defines a longitudinally extending opening configured to receive the first and second associated poles;
the first contact device: (1) comprises first and second arms; (2) is positioned within the first housing slot;
the second contact device: (1) comprises first and second arms; (2) is positioned within the second housing slot; and,
wherein, the first and second arms of the first contact device and the first and second arms of the second contact device are arranged and configured to operably receive the first associated pole therebetween.

7. An extendable pole mechanism for use with a first associated pole that is longitudinally movable with respect to a second associated pole to adjust the overall length of both poles, the extendable pole mechanism comprising:
a housing configured to receive the first and second associated poles;
a first contact device that: (1) is mounted in supported relationship to the housing; (2) is moveable with respect to the housing; and, (3) comprises first and second arms arranged and configured to receive the first associated pole;
a second contact device that: (1) is mounted in supported relationship to the housing; (2) is moveable with respect to the housing; and, (3) comprises first and second arms arranged and configured to receive the first associated pole;
a first lever that is: (1) is mounted in supported relationship to the housing; and, (2) is moveable with respect to the housing;
a second lever that is: (1) is mounted in supported relationship to the housing; and, (2) is moveable with respect to the housing;
a trigger that is: (1) is mounted in supported relationship to the housing; and, (2) is moveable with respect to the housing;
wherein the extendable pole mechanism is adjustable by moving the trigger with respect to the housing to cause the first and second levers to move with respect to the housing to cause the first and second contact devices to move with respect to the housing between: (1) a use condition where portions of each of the first and second contact devices are arranged toward one another and are not parallel with each other; and, (2) an adjustment condition where: the portions of each of the first and second contact devices are moved away from each other relative to the use condition;
a first biasing device that exerts a first biasing force that biases the first contact device toward contact with the first associated pole; and,
a second biasing device that exerts a second biasing force that biases the second contact device toward contact with the first associated pole;

wherein, the first lever pivots in a first direction with respect to the housing to cause the first contact device to move with respect to the housing between the use condition and the adjustment condition; and,
wherein the second lever pivots in a second direction with respect to the housing that is substantially opposite to the first direction to cause the second contact device to move with respect to the housing between the use condition and the adjustment condition.

8. The extendable pole mechanism of claim 7 wherein:
the first biasing device biases the first contact device in a first direction; and,
the second biasing device biases the second contact device in a second direction that is substantially opposite the first direction.

9. The extendable pole mechanism of claim 8 wherein:
the first biasing device is a first spring comprising first and second coils connected together by a mid-section;
the second biasing device is a second spring comprising first and second coils connected together by a mid-section;
the mid-section of the first spring contacts the first contact device to bias the first contact device; and,
the mid-section of the second spring contacts the second contact device to bias the second contact device.

10. The extendable pole mechanism of claim 7 wherein:
the first lever: (1) comprises first and second contact surfaces; and, (2) is pivotal with respect to the housing;
the second lever: (1) comprises first and second contact surfaces; and, (2) is pivotal with respect to the housing;
the trigger: (1) comprises a lever contact device; and, (2) is pivotal with respect to the housing; and,
wherein the extendable pole mechanism is adjustable by pivoting the trigger with respect to the housing to cause the lever contact device to contact the first contact surfaces of the first and second levers to cause the second contact surfaces of the first and second levers to contact the first and second contact devices, respectively, to cause the first and second contact devices to move with respect to the housing between the use condition and the adjustment condition.

11. The extendable pole mechanism of claim 7 wherein:
the housing comprises first and second housing slots;
the first contact device: (1) is ring shaped; (2) a first portion of the first contact device is contacted by the first biasing device; and (3) a second portion of the first contact device is positioned within the first housing slot; and,
the second contact device: (1) is ring shaped; (2) a first portion of the second contact device is contacted by the second biasing device; and (3) a second portion of the second contact device is positioned within the second housing slot.

12. A method comprising the steps of:
(A) providing an extendable pole mechanism for use with a first associated pole that is longitudinally movable with respect to a second associated pole, the extendable pole mechanism comprising: (1) a housing configured to receive the first and second associated poles; (2) a first contact device mounted in supported relationship to the housing and moveable with respect to the housing; (3) a second contact device mounted in supported relationship to the housing and moveable with respect to the housing; (4) a first lever mounted in supported relationship to the housing and moveable with respect to the housing; (5) a second lever mounted in supported relationship to the housing and moveable with respect to the housing; and, (6) a trigger mounted in supported relationship to the housing and moveable with respect to the house; and, (B) adjusting the extendable pole mechanism by moving the trigger with respect to the housing to cause the first and second levers to move with respect to the housing to cause the first and second contact devices to move with respect to the housing from: (1) a use condition where portions of each of the first and second contact devices are arranged toward one another and where the first and second contact devices are not parallel with each other; and, (2) an adjustment condition where the first and second contact devices are each arranged at right angles or approximately right angles relative to the first and second associated poles, wherein the step of adjusting the extendable pole mechanism from the use condition to the adjustment condition comprises the steps of:

pivoting the first lever in a first direction with respect to the housing to cause the first contact device to move with respect to the housing; and, pivoting the second lever in a second direction that is substantially opposite the first direction with respect to the housing to cause the second contact device to move with respect to the housing.

13. The method of claim 12 wherein:

step (A) comprises the steps of: providing a first biasing device that exerts a first biasing force that biases the first contact device toward the use condition; and, providing a second biasing device that exerts a second biasing force that biases the second contact device toward the use condition; and, the step of adjusting the extendable pole mechanism from the use condition to the adjustment condition comprises the step of: overcoming the first and second biasing forces.

14. The method of claim 13 wherein:

the step of biasing the first contact device comprises the step of biasing the first contact device in a first direction; and, the step of biasing the second contact comprises the step of biasing the second contact device in a second direction that is substantially opposite the first direction.

15. The method of claim 13 wherein:

step (A) comprises the steps of: providing the first biasing device to be a first spring comprising first and second coils connected together by a mid-section; and, providing the second biasing device to be a second spring comprising first and second coils connected together by a mid-section;

the step of biasing the first contact device comprises the step of biasing the first contact device by contacting the first contact device with the mid-section of the first spring; and, the step of biasing the second contact device comprises the step of biasing the second contact device by contacting the second contact device with the mid-section of the second spring.

16. The method of claim 12 wherein:

step (A) comprises the steps of: (1) providing the first lever to comprise first and second contact surfaces and to be pivotal with respect to the housing; (2) providing the second lever to comprise first and second contact surfaces and to be pivotal with respect to the housing; and, (3) providing the trigger to comprise a lever contact device and to be pivotal with respect to the housing; and, the step of adjusting the extendable pole mechanism comprises the step of: pivoting the trigger with respect to the housing to cause the lever contact device to contact the first contact surfaces of the first and second levers to cause the second contact surfaces of the first and second levers to contact the first and second contact devices, respectively, to cause the first and second contact devices to move with respect to the housing out of the use condition to the adjustment condition.

17. The method of claim 12 wherein:

step (A) comprises the steps of: (1) providing the housing to comprise first and second housing slots; (2) providing the first contact device to comprise first and second arms that are arranged and configured to operably receive the first associated pole and to be positioned within the first housing slot; and, (3) providing the second contact device to comprise first and second arms that are arranged and configured to operably receive the first associated pole and to be positioned within the second housing slot; and, the step of adjusting the extendable pole mechanism from the use condition to the adjustment condition comprises the step of: pivoting the first and second contact devices about the first and second housing slots, respectively.

* * * * *